United States Patent [19]
Miyamoto

[11] Patent Number: 6,166,313
[45] Date of Patent: Dec. 26, 2000

[54] MUSICAL PERFORMANCE DATA EDITING APPARATUS AND METHOD

[75] Inventor: Hiromu Miyamoto, Hamamatsu, Japan

[73] Assignee: Yamaha Corporation, Hamamatsu, Japan

[21] Appl. No.: 09/401,741

[22] Filed: Sep. 23, 1999

[30] Foreign Application Priority Data

Sep. 24, 1998 [JP] Japan ................................. 10-287265

[51] Int. Cl.[7] .................................................. G09B 15/02
[52] U.S. Cl. .......................... 84/477 R; 84/600; 84/615; 84/653
[58] Field of Search ..................... 84/600–606, 615–616, 84/653–654, 477 R, DIG. 6

[56] References Cited

FOREIGN PATENT DOCUMENTS

| 60-14591 | 9/1985 | Japan . |
| 1-179046 | 7/1989 | Japan . |
| 10-097249 | 4/1998 | Japan . |

*Primary Examiner*—Paul Ip
*Assistant Examiner*—Marlon T. Fletcher
*Attorney, Agent, or Firm*—Morrison & Foerster

[57] ABSTRACT

The apparatus stores musical performance data of a polychord stringed musical instrument such as a guitar. A series of performance data on each of the plural strings are recorded on each of a plurality of recording tracks provided correspondingly to the plural strings, the recording data in combination constituting tablature data for exhibiting a tablature notation of the music on the stringed instrument in the display screen. The tablature notation includes a plurality of horizontal lines representing the plural strings and fret numbers at positions of the note generation on each string. Using a mouse or cursor keys, the user can select a desired fret number on a desired string, and alter the fret number to alter the note pitch to be generated on the same string or drag the selected fret number on the selected string to another string to alter the string of the tone generation. According to such alteration of the fret number or the string, the note data in the corresponding track is altered into note data on the track corresponding to the same or the altered string, accordingly. The fret number can be rewritten by inputting another number using the ten-key switches.

20 Claims, 10 Drawing Sheets

Fig.2
| 16A |
|---|
| Track 1 ( Normal : Intermingled for 6 Strings) |
| Track 2 (Blank) |
| Track 3 (Blank) |
| Track 4 (Normal: Other Data) |
| Track 5 (Guitar TAB-A 1st String) |
| Track 6 (Guitar TAB-A 2nd String) |
| Track 7 (Guitar TAB-A 3rd String) |
| Track 8 (Guitar TAB-A 4th String) |
| Track 9 (Guitar TAB-A 5th String) |
| Track 10 (Guitar TAB-A 6th String) |
| ⋮ |
Fig.3
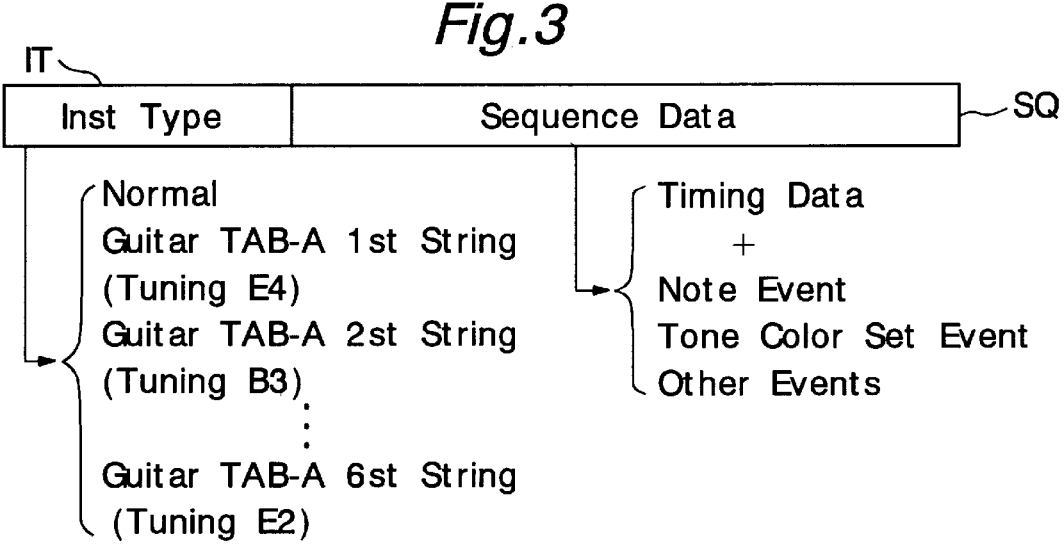
Fig.5
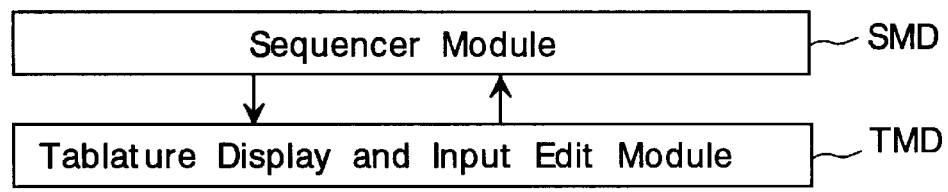

Fig. 4a

| Track View | | 1 | | 5 | |
|---|---|---|---|---|---|
| Trk | Inst Type | M | | | |
| 1 | Nomal | M | Block1 | | |
| 2 | Nomal | | | | |
| 3 | Nomal | | | | |
| 4 | Nomal | | Block2 | | |
| 5 | Gtr Tab A 1st Str | | Guitar A Str-1 | | |
| 6 | Gtr Tab A 2nd Str | | Guitar A Str-2 | | |
| 7 | Gtr Tab A 3rd Str | | Guitar A Str-3 | | |
| 8 | Gtr Tab A 4th Str | | Guitar A Str-4 | | |
| 9 | Gtr Tab A 5th Str | | Guitar A Str-5 | | |
| 10 | Gtr Tab A 6th Str | | Guitar A Str-6 | | |
| 11 | Nomal | | | | |
| 12 | Nomal | | | | |
| 13 | Nomal | | | | |
| 14 | Nomal | | | | |
| 15 | Nomal | | | | |

40A

40a

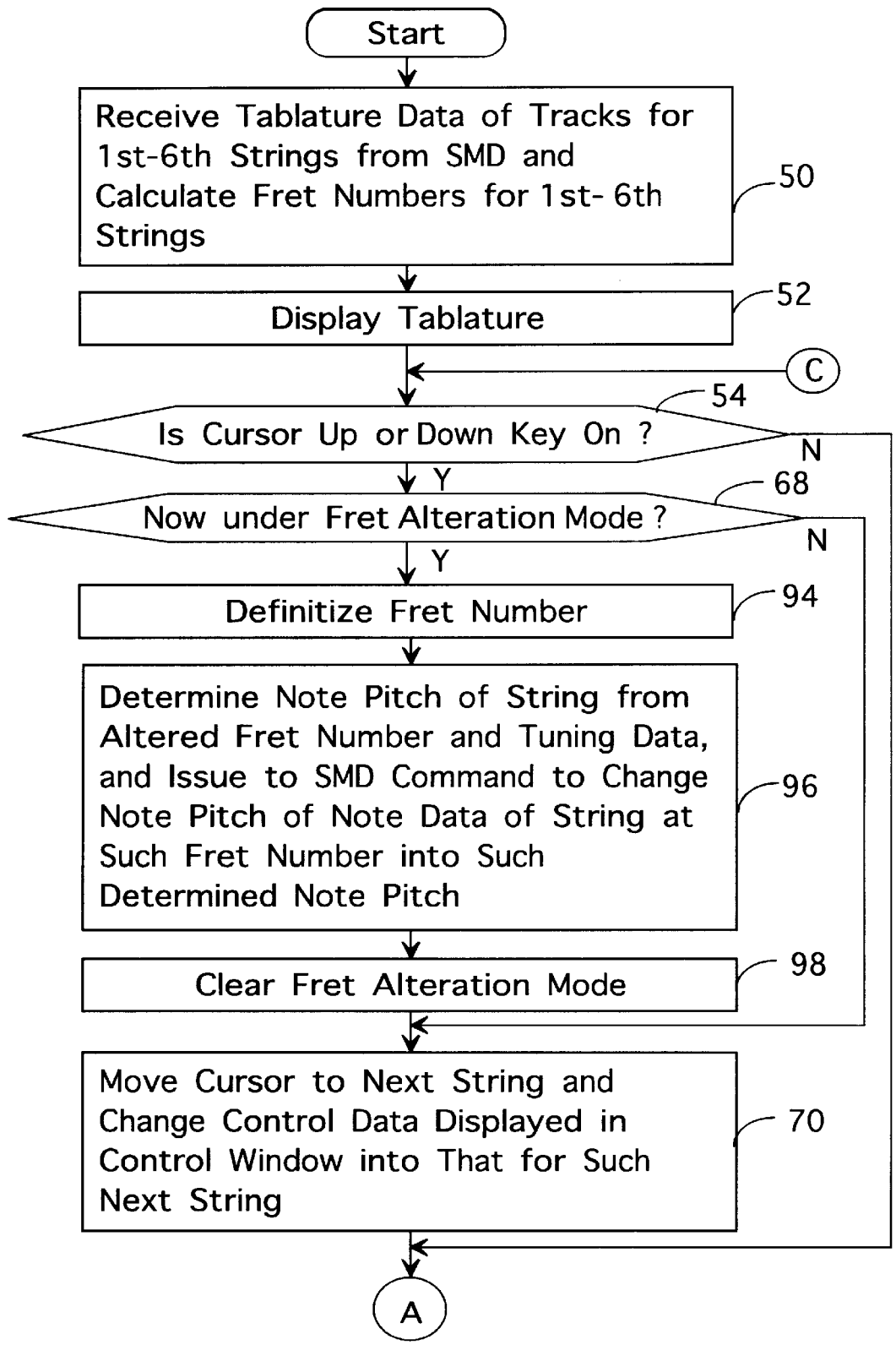

MUSICAL PERFORMANCE DATA EDITING APPARATUS AND METHOD

RELATED APPLICATION

This application claims priority from Japanese Patent Application No. 10-287265, filed Sep. 24, 1998, the contents of which are incorporated hereinto by this reference.

BACKGROUND OF THE INVENTION

1. Field of the Invention

The present invention relates to a musical performance data editing apparatus and method, and a machine readable medium containing program instructions for configuring and practicing such an apparatus and a method using a computer system, and more particularly to an apparatus and a method capable of editing the contents of a tablature on a computer screen, wherein, for example, a user selects or designates an arbitrary fret number on the tablature, and can alter the fret number of the same string or can drag the same to another intended string to change the string so that the note pitch in the note data is altered accordingly, which facilitates the edition and creation of the musical performance data.

2. Description of the Prior Art

Heretofore proposed in the prior art is an automatic music performing apparatus for recording and playing back music data of stringed instrument performance, such as of a guitar part, which apparatus is provided with separate recording tracks for recording a plurality of series of performance data respectively corresponding to the respective ones of a plurality of strings of an instrument so that the tone colors, etc. can vary delicately from one string to another. According to such a type of automatic music performing apparatus, however, the performance data for each track is inputted individually and separately into each track, i.e. in a track by track fashion and is edited individually and separately on each track, which requires intricate and troublesome tasks and accordingly will take time.

SUMMARY OF THE INVENTION

It is, therefore, a primary object of the present invention to provide a novel type of musical performance data editing apparatus and method, and a machine readable medium containing a program therefor on which the performance data for each string can be inputted and edited easily.

In order to accomplish the object of the present invention, one aspect of the invention provides a musical performance data editing apparatus which comprises: a storage device which includes a plurality of recording tracks for recording a plurality of series of performance data corresponding to a plurality of strings of a stringed musical instrument, each series of performance data corresponding to each of the strings and including note data representing note pitches of musical tones to be generated on such each string; a display device which has a display screen and exhibits on the display screen a plurality of lines respectively corresponding to the plurality of strings, indicating a stopping position of each of the strings which defines the note pitch represented by the note data; a manipulating device which is to be manipulated by a user of the apparatus and produces a command in response to a user's manipulation to cause the string stopping position on one of the plurality of strings to be moved onto another of the plurality of strings exhibited on the display screen; a display control device which controls the display device to move the string stopping position on one of the lines corresponding to the one of the strings onto another of the lines corresponding to the other of the strings on the display screen in response to the command from the manipulating device; and an editing device which, in response to the command, deletes the note data representing the note pitch defined by the stopping position on the string before the move from the series of performance data on the track corresponding to that string, and inserts note data representing a note pitch defined by the stopping position on the other string after the move into the series of performance data on another track corresponding to the other string.

According to the above aspect of the present invention, as the user manipulates the manipulating device to move the string stopping position (i.e. the fret number in the case of the guitar) from one string to another, the display control device causes the string stopping position to move from one line (string) to another in the tablature notation on the display screen. Following the move of the stopping position from one string to another, the note data on the recording track for such one string is deleted and note data is written onto the recording track for such another string automatically, which dispenses with individual tasks of deleting and inserting the note data.

In this aspect of the invention, each of the series of performance data may further include tuning data of the corresponding string representing the note pitch at its open string status so that the editing device can determine the note pitch of the note data to be inserted based on the tuning data of one string and the tuning data of another string. Thus, the move of the same stopping position from one string to another causes the move of the note data from one track to another automatically altering the note pitch in the note data, which dispenses with a separate correcting task of the note pitch by the user. Further in this aspect of the invention, by altering the stopping position of one string based on a pitch difference between the tuning data of such one string and the tuning data of another string to obtain a new stopping position for such another string for the generation of the same note pitch, the stopping position displayed on such one string will be altered to such another stopping position on such another string and the note data having the same note pitch is moved from one track for such one string to another track for such another string, which dispenses with a separate correcting task of the stopping position by the user.

In order to accomplish the object of the present invention, another aspect of the invention provides a musical performance data editing apparatus which comprises: a storage device which includes a plurality of recording tracks for recording a plurality of series of performance data corresponding to a plurality of strings of a stringed musical instrument, each series of performance data corresponding to each of the strings and including note data and timing data respectively representing note pitches and time points of musical tones to be generated on such each string; a display device which has a display screen and exhibits on the display screen a plurality of horizontal lines respectively corresponding to the plurality of strings, indicating a stopping position of each of the strings which defines the note pitch represented by the note data, and also exhibits a plurality of vertical lines crossing the horizontal lines and spaced apart from each other by a distance corresponding to a unit count time of a music progression; a manipulating device which is to be manipulated by a user of the apparatus and produces a command in response to a user's manipulation to cause the string stopping position at one of the vertical lines on one of the plurality of strings to be moved to another of the vertical lines on such one string exhibited on the display screen; a display control device which controls the display device to move the string stopping position on one of the lines corresponding to such one string from such one vertical line to such another vertical line on the display screen in response to the command from the manipulating device; and an editing device which, in response to the command, alters the timing data in the series of performance data on one of the tracks corresponding to such one string representing the musical time point defined by such one vertical line at which the stopping position locates on such one string before the move to represent the musical time point defined by such another vertical line.

According to the above aspect of the present invention, as the user manipulates the manipulating device to move the string stopping position on one string from one time point to another, the display control device causes the string stopping position to move from one vertical line (time point) to another along the same horizontal line in the tablature notation on the display screen. Following the move of the stopping position from one vertical line to another, the timing data of the note data on the recording track for such one string is altered to such another time point automatically, which dispenses with individual tasks of deleting and inserting the timing data.

In order to accomplish the object of the present invention, a further aspect of the invention provides a musical performance data editing apparatus which comprises: a storage device which includes a plurality of recording tracks for recording a plurality of series of performance data corresponding to a plurality of strings of a stringed musical instrument, each series of performance data corresponding to each of the strings and including note data representing note pitches of musical tones to be generated on such each string and tuning data of such each string representing the note pitch at its string status; a display device which has a display screen and exhibits on the display screen a plurality of lines respectively corresponding to the plurality of strings, indicating a stopping position of each of the strings which defines the note pitch represented by the note data; a selecting device which selects a stopping position on one of the strings; an input device for inputting a stopping position to be an alternative to the selected stopping position; a display control device which controls the display device to exhibit the inputted stopping position in place of the selected stopping position on one of the lines corresponding to such one string on the display screen in response to the input from the input device; and an editing device which, in response to the input from the input device, alters the note data in the series of performance data on one of the tracks corresponding to the selected stopping position on such one string to note data representing a note pitch obtained from the inputted stopping position and the tuming data of such one string.

According to the above aspect of the present invention, as the user selects a string stopping position on one string and inputs an alternative stopping position, the display control device causes the string stopping position to be altered from the selected one into the inputted one in the tablature notation on the display screen. Following the alteration of the stopping position, the note pitch in the note data on the recording track for such one string is altered to a note pitch corresponding to the inputted stopping position automatically, which dispenses with individual tasks of deleting and inserting the note pitch data.

In order to accomplish the object of the present invention, a still further aspect of the invention provides a musical performance data editing apparatus which comprises: a storage device which includes a plurality of recording tracks for recording a plurality of series of performance data corresponding to a plurality of strings of a stringed musical instrument, each series of performance data corresponding to each of the strings and including note data representing note pitches of musical tones to be generated on such each string; a display device which has a display screen and exhibits on the display screen a plurality of lines respectively corresponding to the plurality of strings, indicating a stopping position of each of the strings which defines the note pitch represented by the note data; a manipulating device which is to be manipulated by a user of the apparatus and produces a command in response to a user's manipulation to locate a cursor at a desired one of the lines corresponding to one of the strings exhibited on the display screen; a display control device which controls the display device to locate the cursor on the line corresponding to the desired one of the strings in response to the command from the manipulating device; and an editing device which, in response to the command, conducts the edition of the performance data including at least any one of inputting, alteration and deletion with respect to the data concerning such one line on which the cursor is located.

According to the above aspect of the present invention, the user can conduct the inputting, alteration or deletion of the data with the cursor located on the desired stopping position in the tablature notation.

In order to accomplish the object of the present invention, a still further aspect of the invention provides a musical performance data editing apparatus which comprises: a storage device which includes a plurality of recording tracks for recording a plurality of series of performance data corresponding to a plurality of strings of a stringed musical instrument, each series of performance data corresponding to each of the strings and including control data representing a controlling condition of parameters of musical tone generation on such each string; a display device which has a display screen and exhibits on the display screen a plurality of lines respectively corresponding to the plurality of strings, indicating a stopping position of each of the strings which defines the note pitch represented by the note data; a manipulating device which is to be manipulated by a user of the apparatus and produces a command in response to a user's manipulation to locate a cursor at a desired one of the lines corresponding to one of the strings exhibited on the display screen; and a display control device which, in response to the command from the manipulating device, reads out from the storage device the control data in the performance data of the string corresponding to such one line on which the cursor is located, and controls the display device to exhibit the controlling condition of parameters of the musical tone generation based on the read out control data.

According to the above aspect of the present invention, as the user locates the cursor on any arbitrary string using the manipulating device, the display screen exhibits the parameter conditions of the notes in the musical performance based on the control data in the performance data with respect to the string pointed by the cursor. Thus, the user can easily recognize the parameter conditions for the tone generation, and also can input or alter the control data according to necessity.

In order to accomplish the object of the present invention, a still further aspect of the invention provides a musical performance data editing apparatus which comprises: a storage device which includes a plurality of recording tracks for recording a plurality of series of performance data corresponding to a plurality of strings of a stringed musical instrument, each series of performance data corresponding to each of the strings and including note data and timing data respectively representing note pitches and time points of musical tones to be generated on such each string, and tuning data of such each string representing the note pitch at its open string status; a display device which has a display screen and exhibits on the display screen a plurality of horizontal lines respectively corresponding to the plurality of strings, indicating a stopping position of each of the strings which defines the note pitch represented by the note data, and also exhibits a plurality of vertical lines crossing the horizontal lines and spaced apart from each other by a distance corresponding to a unit count time of a music progression; a selecting device which selects one of the vertical lines along one of the horizontal lines; a display control device which controls the display device to exhibit a new stopping position at the location of the selected vertical line on such one horizontal line; and an editing device which, in response to the selection of the vertical line, writes the timing data corresponding to the selected vertical line and note data corresponding to the new stopping position into the performance data on the track in the storage device corresponding to such one string, a note pitch of the note data being obtained from the new stopping position and the tuning data of such one string.

According to the above aspect of the present invention, as the user selects a desired time point on one of the plural horizontal lines (strings), the display device exhibits a new stopping position at the selected time point. Then, on the recording track corresponding to the selected string are written note data including the timing data corresponding to the selected time point and the note pitch corresponding to the new stopping position. And in this connection, when the note data for the new stopping position is written, the note pitch for the note data is obtained automatically based on the tuning data of the selected string, which dispenses with the user's task of inputting the note generation time point and the note pitch for the note data with respect to the new stopping position.

As will be understood from the above description about the apparatus for editing musical performance data, a sequence of the steps each performing the operational function of each of the structural elements of the above musical performance data editing apparatus will constitute an inventive method for editing musical performance data according to the spirit of the present invention.

Further as will be understood from the above description about the apparatus and the method for editing musical performance data, a machine readable medium containing a program instructions executable by a computer system for executing a sequence of the processes each performing the operational function of each of the structural elements of the above musical performance data editing apparatus or performing each of the steps constituting the above musical performance data editing method will reside within the spirit of the present invention.

Further as will be apparent from the description herein later, some of the structural element devices of the present invention are configured by a computer system performing the assigned functions according to the associated programs. They may of course be hardware structured discrete devices.

The present invention may take form in various components and arrangement of components and in various steps and arrangement of steps. The drawings are only for purposes of illustrating a preferred embodiment and processes and are not to be construed as limiting the invention

BRIEF DESCRIPTION OF THE DRAWINGS

For a better understanding of the present invention, and to show how the same may be practiced and will work, reference will now be made, by way of example, to the accompanying drawings, in which:

FIG. 2 is a chart showing an example of the data recording allocation of the performance data and of the tablature data in the present invention;

FIG. 3 is a chart showing an example of the format of performance data recorded on one track;

FIGS. 4a and 4b are screen shots showing examples of displayed images during the process of the present invention;

FIG. 5 is a block diagram illustrating the structure of processing programs of the present invention;

FIG. 6 is a flow chart showing a part of a guitar window processing according to the present invention;

DESCRIPTION OF THE PREFERRED EMBODIMENTS

Figure 1:
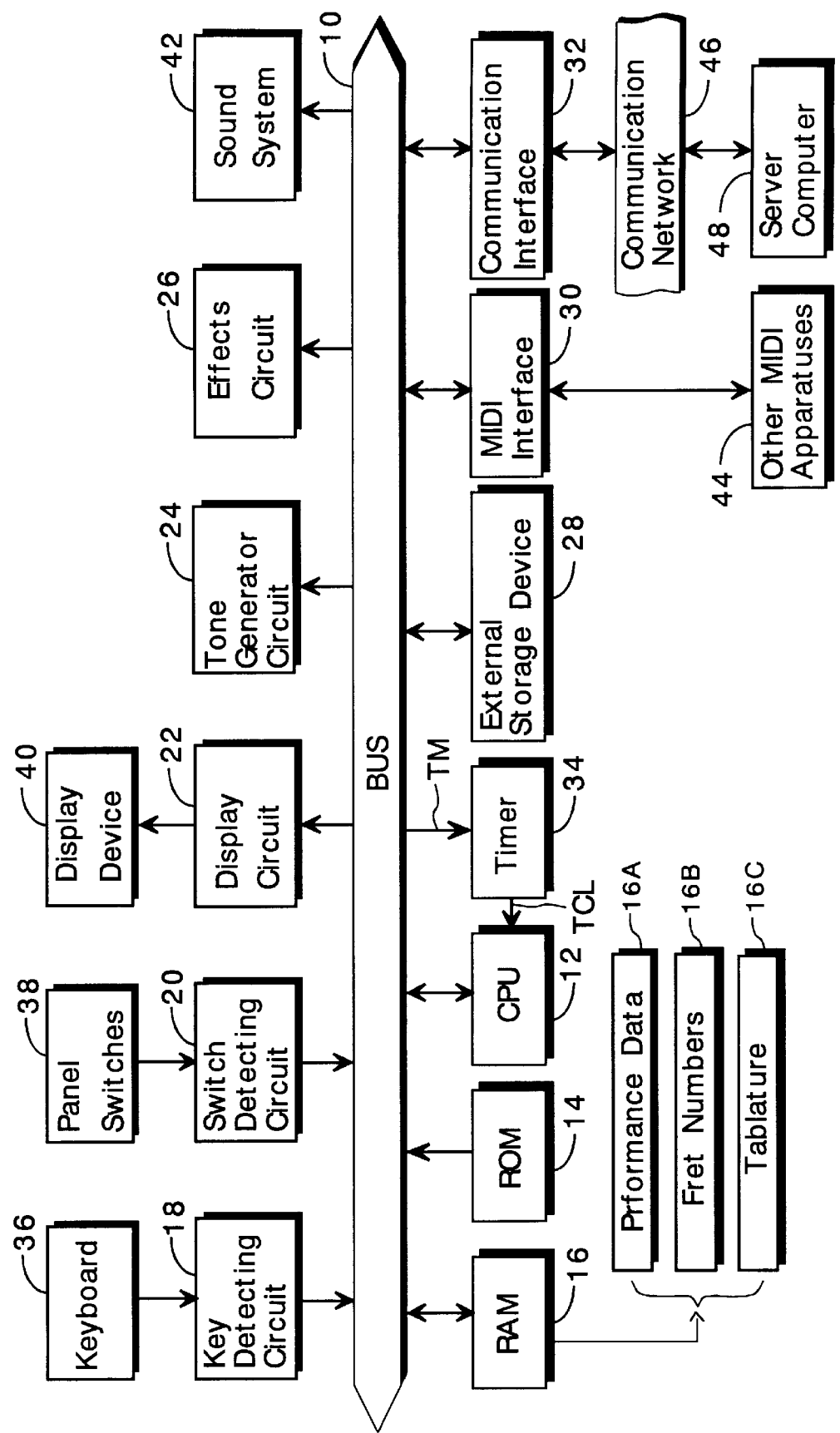
FIG. 1 is a block diagram illustrating the configuration of an example of an electronic musical instrument embodying a musical performance data editing apparatus according to the present invention.

Illustrated in FIG. 1 of the drawings is a general block diagram showing an example of an electronic musical instrument embodying a performance data editing apparatus according to the present invention, as configured with a small scale computer and the associated circuits for generating tone signals as well as creating and editing performance data.

Connected to a bus 10 are a CPU (central processing unit) 12, a ROM (read only memory) 14, a RAM (random access memory) 16, a key detecting circuit 18, a switch detecting circuit 20, a display circuit 22, a tone generator 24, an effects circuit 26, an external storage device 28, a MIDI (musical instrument digital interface) interface 30, a communication interface 32, a timer 34, etc.

The CPU 12 is to execute various processing including generation of tone signals and edition of performance data according to the programs stored in the ROM 14. The data edition processing will be described in detail hereinafter with reference to FIGS. 6–10. The RAM 16 includes various storage areas to be used in various processing as executed by the CPU 12, such storage areas being, for example, a performance data storing area 16A, a fret number storing area 16B and a tablature storing area 16C. The key detecting circuit 18 is to detect the actuations of the keys in a musical keyboard 36, while the switch detecting circuit 20 is to detect the actuations of panel switches 38 including buttons, tablets, knobs, etc. The panel switches 38 may be arranged as an alphanumeric keyboard (such as of a computer) capable of inputting characters and numerals, and may also include a mouse device. The display circuit 22 is to control the displaying operations of the display device 40 to render various representations and exhibitions on the display screen.

The tone generator 24 includes a plurality of tone generation channels for generating plural tones simultaneously for a polyphonic performance. The types of the tone generating fashion may be arbitrarily employed from among the waveform memory type, the FM synthesis type, the physical model type, the harmonics synthesis type, the format synthesis type, the analog synthesizer type including VCO's, VCF's, VCA's, etc. and any other types. The tone generator 24 may not be limited to an exclusive hardware device, but may be a combination of a DSP (digital signal processor) and a microprogram, or a combination of a CPU and a software program. The plurality of tone generating channels may be constructed by individual separate circuits of the number corresponding to the number of channels, or may be constructed by a single circuit operated in a time division multiplexed fashion with a number of time slot channels corresponding to the number of channels.

The effects circuit 26 is to impart to the tone signals generated by the tone generator circuit 24 various effects such as a chorus effect and a reverberation effect. The tone signals outputted from the effects circuit 26 are supplied to a sound system 42 to be converted into audible sounds.

The external storage device 28 is a storage device detachably including a storage medium or media of one or more types such as a hard disk (HD), a floppy disk (FD), a compact disk (CD), a digital versatile disk (DVD) and a magneto-optical disk (MO). When the external storage device 28 is equipped with a desired storage medium, the data in the storage medium can be transferred to the RAM 16. And where the equipped storage medium is of a writable type such as an HD and an FD, the data in the RAM 16 can be transferred to such a storage medium.

On the storage medium (the above-mentioned HD, FD, CD, DVD, MO, etc.) in the external storage device 28 are recorded performance data for automatic performances of a plurality of pieces of music, i.e. tunes as the data base for the present invention. The user will select a set of performance data representing a desired piece of music from the external storage device as preparation for an automatic performance or a data edition. The selected set of performance data constituting one piece of music, i.e. a tune, are then written into the storing area 16A of the RAM 16. As the data base of the performance data, the ROM 14 may be used in place of the external storage device 28. And as the means for storing the programs, such a storage medium equipped in the external storage device 28 may also be used, in place of the ROM 14. In such a latter situation, the programs stored in the storage medium are transferred from the external storage device 28 to the RAM 16, and the CPU 12 is operated according to the programs thus transferred to and stored in the RAM 16. Such a configuration is advantageous in that an addition or an up-grading of the programs will be easily made.

The MDI interface 30 is provided to transmit performance information, etc. to and receive the same from another MIDI apparatus 44 such as an automatic performance apparatus. The MIDI interface 30 may not necessarily be an exclusively provided MIDI interface, but may be constructed by using a general-purpose interface such as an RS-232C, a USB (universal serial bus) and an IEEE1394. With such an arrangement, data other than the MIDI messages may also be transmitted to and from the external MIDI apparatus concurrently.

The communication interface 32 is provided to communicate with a server computer 48 via a communication network 46 such as a LAN (local area network), the Internet and a telephone line. The programs and various data which are necessary for practicing the present invention may be downloaded into the RAM 16 or into the external storage device 28 from the server computer 48 via the communication network 46 and the communication interface 32 with a down loading request.

The timer 34 is to generate a tempo clock signal TCL at a period corresponding to given tempo data TM. The tempo clock signal TCL is supplied to the CPU 12 as an interrupt request signal. Upon receipt of each pulse of the tempo clock signal TCL, the CPU 12 initiates an interrupt routine. Making use of the interrupt processing, an automatic music performance can be realized based on the generated music (melody) data stored in the storage area 16A.

In the above described electronic musical instrument every time a key is depressed in the keyboard 36, the CPU 12 supplies to the tone generator 24 a pitch information signal and a tone generation instructing signal corresponding to the depressed key. The tone generator 24 generates a musical tone signal having a pitch corresponding to the depressed key in response to the pitch information signal and the tone generation instructing signal. Thus, the tones for a manual musical performance are generated.

FIG. 2 shows an example of the data recording arrangement for the performance data and the tablature data in the RAM 16. The storage area 16A of the RAM 16 includes a number of tracks on each of which can be recorded performance data. Thus, as the user selects performance data of a desired piece of music, or a tune, from the external storage device 28, the performance data of the selected one piece of music are written into the storage area 16A of the RAM 16.

For example, where the selected performance data of one piece of music contains melody performance data in the guitar timbre (tone color) and rhythm performance data in the rhythm instrument timbre, the melody performance data is written on Track 1 and the rhythm performance data is written on Track 4, leaving Tracks 2 and 3 blank. (The Tracks 2 and 3 are prepared for the chord performance and the bass performance, respectively.) The melody performance data on Track 1, in this example, contains the performance data of six strings of the guitar in an intermixed state.

In the storage area 16A of the RAM 16 are written the tablature data consisting of plural series of performance data, each series for each of the guitar strings, when the performance data (of one series) stored on one track (i.e. Track 1) in the storage area 16A is divided into plural series of performance data respectively corresponding to the plural strings of the guitar or the like stringed musical instrument. Where the performance data of one piece of music is read out from the external storage device 28 and written in the storage area 16A and dividing processing has not yet been conducted, the Tracks 2, 3 and 5 and above are in a blank state. As an example, where the melody performance data of the guitar timbre recorded on Track 1 is divided into six parts corresponding to the six strings of the guitar to obtain six series of performance data respectively corresponding to the first through sixth strings, the six series of performance data constituting a set of tablature data for the respective ones of the first through sixth strings are written on Tracks 5 through 10 as illustrated in FIG. 2. Various methods are known in the art for dividing the intermixed performance data for six strings into individual performance data for each of the six strings, among which the one disclosed in the unexamined patent publication No. Hei10-97249 (1998) can be employed for the present invention.

FIG. 3 illustrates a data format of the performance data recorded on one track in the storage area 16A. The performance data on one track contains sequence data SQ representing the note progression of the performance and inst type data IT serving as the header data for the data SQ. The term "inst type" herein used is an abbreviation of "instrument type", and means the type of performance data from an instrumental point of view with respect to the included tones. One inst type in this context corresponds to a series of performance data representing a musical performance in one tone color (timbre), polyphonic or monophonic, such as a saxophone performance, a drum performance, a guitar performance and an electronic musical instrument performance. Further, in handling the tablature notation, each string is considered to be one instrument having a particular tone color, and thus one guitar is considered as six instruments of a monochord type.

The sequence data SQ is comprised of the timing data and the note event data (hereinafter referred to as "note data" for short) for each of the tones to be generated and the timing data and the tone color set event data (hereinafter, "tone color set data" for short) for each of the tone color set time points, and further, in case of necessity, the timing data and set event data for each of the events of setting other parameters. The note data includes the note pitch data representing the pitch of a note, the velocity data representing the intensity of the note to be generated, and the gate time data representing the duration (length of time) of the note.

The inst type data IT includes mark data indicating a normal performance on the stringed musical instrument of a polychord type where the performance data is the intermixed performance data to be divided into individual string data, or includes mark data indicating the tablature (TAB) notation, data indicating the kind of stringed musical instrument, data indicating the performance part of the stringed musical instrument, data indicating the string number of the instrument and tuning data indicating the note pitch of the open string for each of the strings of the instrument where the performance data is the divided performance data obtained from the normal performance data. In this embodiment, the kind of the string instrument is a guitar having six strings, 1st through 6th strings, and the tuning data of the guitar are E4 (329.628 Hz), B3 (246.942 Hz), G3 (195.998 Hz), D3 (146.832 Hz), A2 (110.000 Hz) and E2 (82.407 Hz) for the first, second, third, fourth, fifth and sixth strings, respectively. The guitar takes charge of the part A in the ensemble, in the illustrated example.

FIG. 4a shows an example of an image on the screen 40A of the display device 40. The screen 40A exhibits a main window 40a of a track view picture indicating the inst type, the recorded data status, etc. for each of the tracks. The main window is a computer window displayed on the screen, when the main routine of a musical performance data processing is running for creating, editing, displaying and playing back the automatic musical performance data to establish a music sequencer. The "Track View" frame includes a track column "Trk" and an inst type column "Inst Type" provided in parallel adjacent to each other, and the inst type is indicated corresponding to each of the track numbers 1, 2, . . . 15, . . . as shown in FIG. 4a. In the example shown, the inst types are "Normal" for the tracks 1 and 4 on which normal performance data are recorded and for the tracks 2, 3, 11, 12, . . . on which no performance data is recorded, while the inst type are "Gtr Tab A 1st Str", . . . "Gtr Tab A 6th Str" for the tracks 5 through 10 on which the divided performance data for the respective strings are recorded according to the allotment shown in FIG. 2.

To the right of the inst type column "Inst Type" are shown the recorded data statuses of the respective tracks in bar graphs. In the example shown, the recorded data statuses of the tracks 1 and 4 each carrying the data according to the allotment as shown FIG. 2 are indicated by horizontal bars (or rods) attached with characters "Block1" and "Block2", respectively, while the recorded data statuses of the tracks 5 through 10 each carrying the divided performance data according to the allotment as shown FIG. 2 are indicated by horizontal bars attached with characters "Guitar A Str-1" through "Guitar A Str-6". The term "block" herein used represents a series of performance data in one tone color. In the area of indicating the recorded data statuses, there are also depicted graduations or notches indicating the measures (and the beats) and the measure numbers such as "1" and "5" on the horizontal axis in the direction of the length of the bars so that the user can easily recognize the amounts of the recorded data on the respective tracks.

Figure 4B:
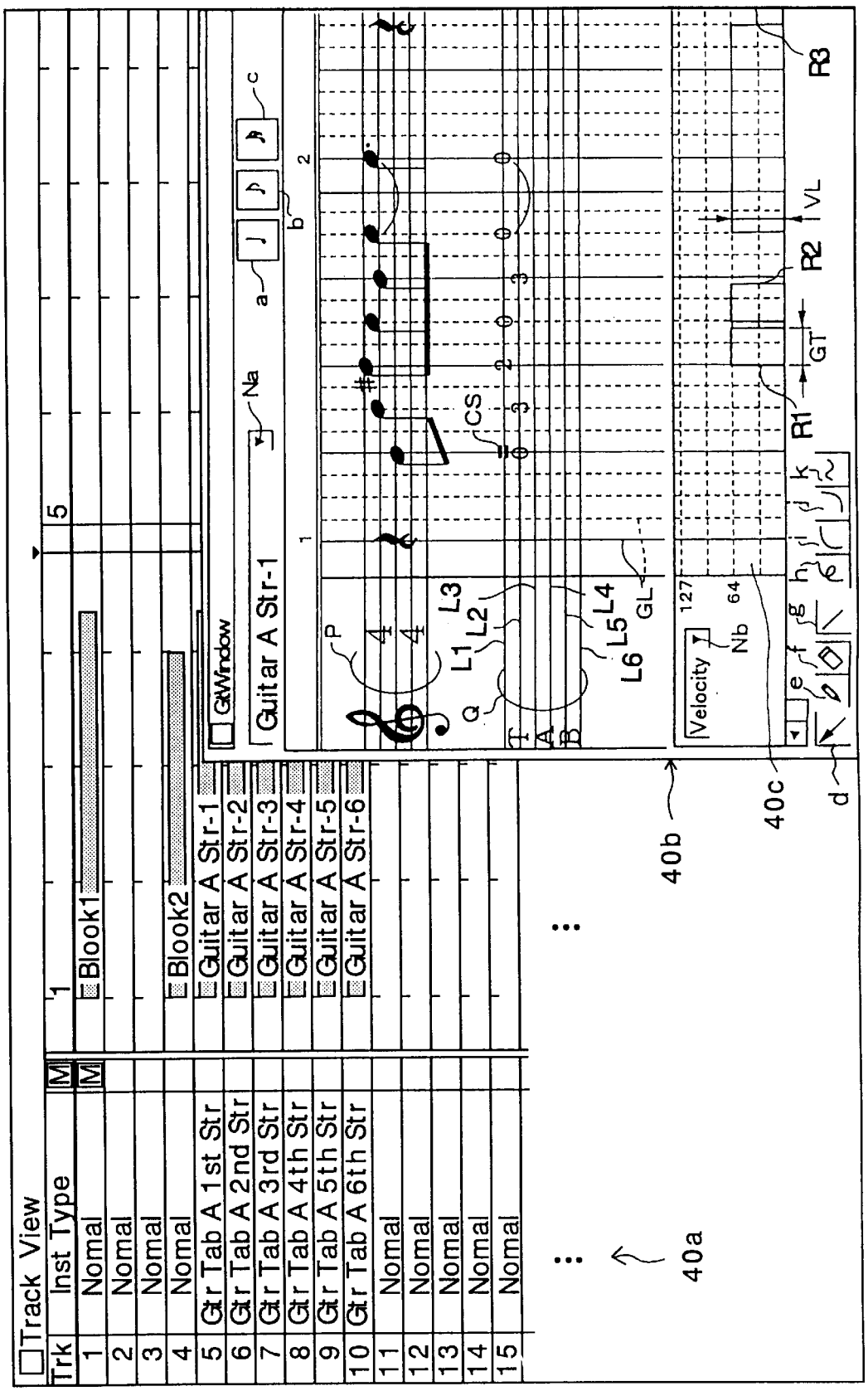

At a part of and superimposed on the main window 40a is exhibited a guitar window 40b as shown in FIG. 4b, when the musical performance data editing processing has been initiated according to an embodiment of the present invention. The guitar window 40b exhibits a five-line staff notation P and a tablature notation Q.

In the tablature Q, six horizontal lines L1 through L6 correspond to the six strings, respectively, of the guitar, while vertical lines GL including solid lines and broken lines indicate the time points for the notes according to the measures and the beats in the music progression. According to the selection of a desired note duration from among the note duration symbols a–c in the right-up area of the sub-window 40b, there appear on the screen picture vertical lines GL indicating the time points in the musical progression. The vertical lines GL are spaced apart from each other by the amount of the selected unit count time in terms of note duration, for example, a quarter note, a eighth note or a sixteenth note. In the illustrated example of FIG. 4b, the vertical lines GL indicate the time points corresponding to every sixteenth note. There are also shown in the tablature Q the positions of stopping (depressing) the strings in terms of the fret numbers such as "0", "3" and "2" corresponding to the respective notes expressed on the five-line staff P. The indication of the positions of depressing (or stopping) the strings are made, for example, by exhibiting the fret numbers on the horizontal lines L1–L6 at the timing positions of the respective note events based on the tablature data on the tracks 5–10 shown in FIG. 2.

With respect to the tablature Q, the cursor CS is moved arbitrarily by manipulating the cursor keys or the mouse in the panel switches 38, but the cursor CS can be placed only at an intersection of any of the horizontal lines L1–L2 and any of the vertical lines GL. And therefore, the cursor cannot stay at positions above the horizontal line L1, below the horizontal line L6, in between the horizontal lines and in between the vertical lines.

When the cursor CS is placed on a desired horizontal line, the name of the string corresponding to that desired horizontal line appears in an indicating box Na near the left-up corner of the guitar window 40b and the controlling condition included in the performance data of the horizontal line (string) on which the cursor is staying is exhibited in a control window 40c which appears at the lower portion of the guitar window 40b. For example, when the cursor CS is placed on the horizontal line L1, the indicating box Na exhibits "Guitar A Str-1". By clicking the mouse with its pointer positioned at the list box Nb and selecting "Velocity" from among the kinds of the control data, the control window 40c exhibits, in the illustrated example, three figures R1, R2 and R3 based on the velocity data and the gate time data included in the performance data of the first string (horizontal line L1), there are three notes to be generated on the first string L1. As to the figures R1–R3, the height VL represents the velocity (in this context, the term "velocity" means the intensity of the tone, as in the case of the piano) value out of "0" through "127" and the width GT represents the gate time (duration) of the respective tones to be produced. By clicking the list box Nb, the user can also chose another control data such as a pitch bend effect from among other choices, and the control window 40c will exhibit such a selected control condition.

Below the control window 40c, there are exhibited an arrow d, a pencil figure e, an eraser figure f, a straight line figure g, a curved line figure h, an upwardly concave figure i, a downwardly convex figure j and a wavy figure k. With the mouse manipulation, the user may select the arrow d, put the arrow on any part of the figures R1–R3 and drag the arrow upward, or downward, or leftward, or rightward to vary the width GT or the height VL of the figure R1–R3. Thus, the gate time values and the velocity values in the performance data can be modified in accordance with the change in the width GT and the height VL. Further with the mouse manipulation, the user may move and click the figure e or f to write or erase the data, and may move and click the figure g–k to vary the figures R1–R3 to modify the values of the control data corresponding to the write, erase or vary manipulation.

FIG. 5 shows the contents of the processing program stored in the ROM 14, wherein the processing program comprises a sequencer module SMD and a tablature display and input edit module TMD. The module SMD controls the processing in connection with the storage area 16A, including the processing of data division (into individual strings), and the module TMD controls those processings that are described in FIGS. 6–10 hereinbelow. The module SMD supplies the tablature data with respect to six strings to the module TMD. The module TMD supplies the various commands with respect to the note data and the timing data, including insert commands, delete commands, alter commands, etc. to the module SMD. In the description below, mention will be made of various switches and keys such as an upward cursor switch, a downward cursor switch, a leftward cursor switch, a rightward cursor switch, a delete switch, an enter switch, ten-key keys, function keys, an exit key, a control key and a shift key, which are provided in a keyboard (computer keyboard) constituting the panel switch group 38.

Figure 7:
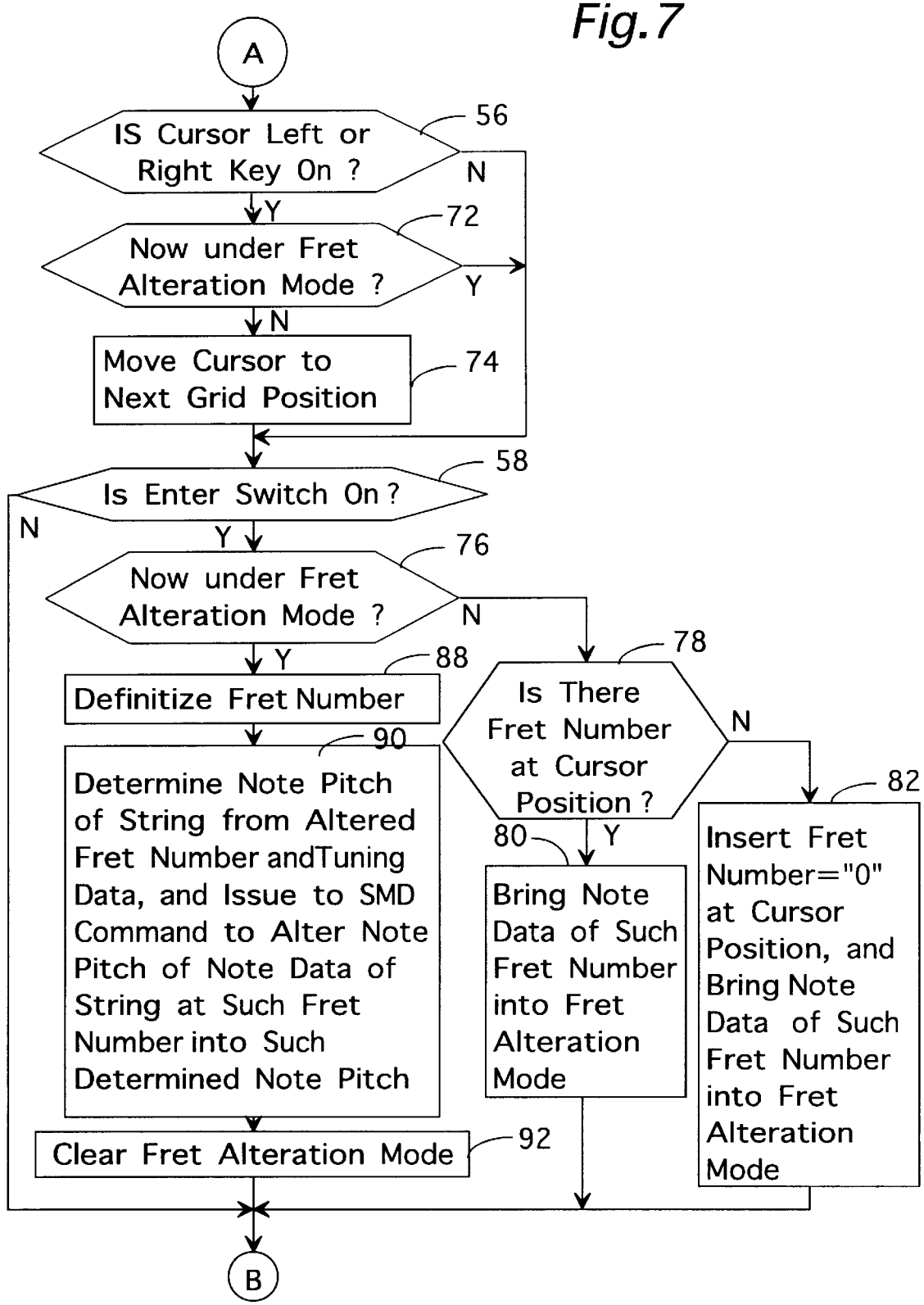
FIG. 7 is a flow chart showing another part of the guitar window processing.
Figure 8:
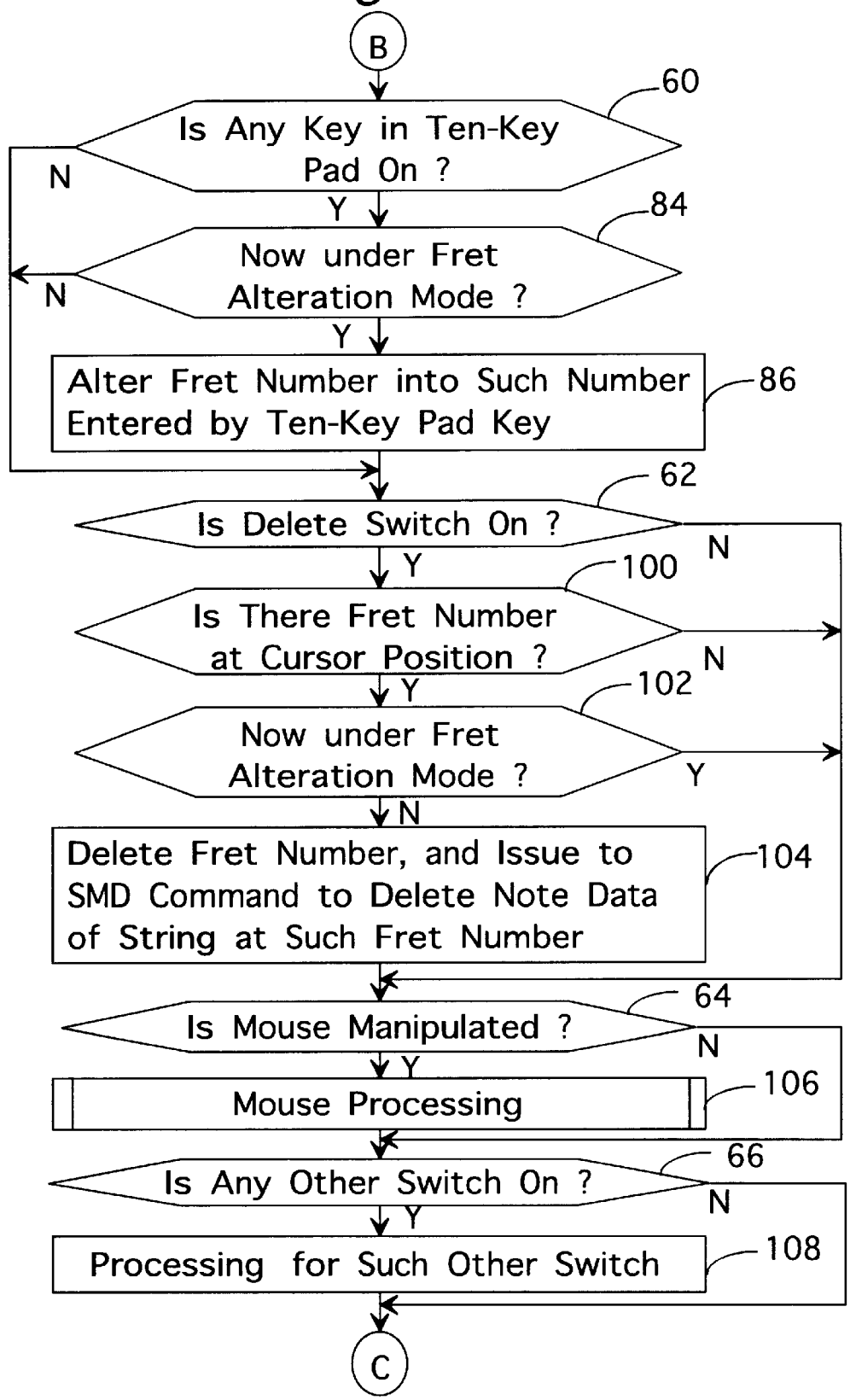
FIG. 8 is a flow chart showing the remaining part of the guitar window processing.

Referring to FIGS. 6–8, the guitar window processing will be described in detail hereinbelow. The guitar window processing is initiated in response to selecting, in the main window 40a of FIG. 4a, any one of a plurality tracks, for example, tracks 5–10, on which the tablature data are recorded, and selecting the guitar window processing from among the process menu (not shown) in the sequencer data processing.

A step 50 receives from the sequencer module SMD tablature data of six tracks corresponding to the 1st through 6th strings and writes the same in the storage area 16C in the RAM 16. More specifically, for example, when the module SMD reads out the tablature data of the tracks 5–10 from the storage area 16A and supplies the same to the module TMD, the tablature data on each of the tracks 5–10 (i.e. performance data of each of the 1st through 6th strings) in the storage area 16A are written onto the 1st through 6th tracks in the storage area 16C.

The way of preparing the tablature data for six strings on the storage area 16A should not be limited to the way described above in which a dividing process is executed over a series of performance data on one track such as Track 1 as mentioned above to produce tablature data of six strings to be recorded in the storage area 16A, but may be another way in which the user inputs the tablature data for each of the six strings by manipulating the keyboard as the panel switches 38 with reference to a tablature book available in the market and stores the data on each of the six tracks in the storage area 16A. In such a case also, the tablature data in the amount of six strings can be received from the module SMD and written on the 1st through 6th tracks in the storage area 16C.

A fret number for each note on each of the 1st through 6th strings is then calculated based on the tablature data of six strings in the storage area 16C. The calculation of the fret number may be conducted according to the following manner. The fret number for a note is determined with reference to the note pitch of the open (non-stopped) state of the string as indicated by the tuning data of the string, which state is nominated as "0th fret" or "fret number 0". The fret number is calculated by subtracting the note pitch of the open string from the note pitch of the note data in the tablature data. For example, with respect to the 1st string (highest string), the note pitch of the open string is E4 (329.628 Hz), and a note F#4 is two semitones higher than the note E4, and thus the fret number for the note F#4 turns out to be "2". It is added here for the readers' reference that the guitar is a transposing instrument by one octave, for which the notes on the staff notation are located at positions one octave above the actual tones generated on the strings. For example, the pitch of the 1st string in its open status is actually E4 (329.628), but the note on the staff is positioned at E5 which is located at the fourth (counted from the bottom) space on the G clef staff As the note pitch of each note is indicated by the note data for each note in the tablature data, the fret number of every note can be obtained based on every note data in the tablature data and on the tuning data of the string for the note. By obtaining the fret number for every note on each of the 1st through 6th strings, fret number data representing the fret number is created for every note on each of the 1st through 6th strings and is written in the storage area 16B in the RAM 16. Thus, the fret number data of the notes on each of the 1st through 6th strings are written on each corresponding one of the 1st through 6th tracks in the storage area 16B. Then the process moves forward to a step 52.

The step 52 displays on the guitar window 40b of FIG. 4b a five-line staff notation P based on the tablature data in the storage area 16C (or based on the performance data in the storage area 16A) and a tablature notation Q based on the tablature data in the storage area 16C and the fret number data in the storage area 16B. In the tablature notation Q, there appear on the horizontal lines L1–L6 the fret numbers such as "0", "3" and "2" at the corresponding positions of the strings and the times based on the fret number data for six strings stored in the storage area 16B.

The next step 54 judges whether there is an on-event of either of the cursor-up key or the cursor-down key in the switch group 38. When the judgment is negative (N), the process skips to a step 56 of FIG. 7. The step 56 judges whether there is an on event of either of the cursor-left key or the cursor-right key in the switch group 38. When the judgment is negative (N), the process skips to a step 58. The step 58 judges whether there is an on-event of the enter switch in the switch group 38. When the judgment is negative (N), the process skips to a step 60 of FIG. 8. The step 60 judges whether there is an on-event of any of the keys in the ten-key pad in the switch group 38. If the judgment is negative (N), the process skips to a step 62. The step 62 judges whether there is an on-event of the delete switch in the switch group 38. If the judgment is negative (N), the process skips to a step 64. The step 64 judges whether there is a manipulation event of the mouse such as dragging and clicking in the switch group 38. If the judgment is negative (N), the process skips to a step 66. The step 66 judges whether there is an on-event of any other key or switch such as a function key or an exit key in the switch group 38. If the judgment is negative (N), the process goes back to the step 54 of FIG. 6. The above described loop of the steps 54–66 is repeated as long as no switch is actuated in the switch group 38, waiting for any switch turned on.

If either the cursor-up key or the cursor-down key is pressed on during the looping through the steps 54–66, the step 54 judges affirmative (Y) to direct the process flow to a step 68. The step 68 judges whether it is now under a fret alteration mode or not. If it is not under the fret alteration mode now, the judgment is negative (N) and the process skips to a step 70. The setting of the fret alteration mode will be described later with reference to the steps 80 and 82.

The step 70 moves the cursor CS to the next horizontal line (one of the lines L1–L6 and herein referred to as a string for the sake of convenience) in the guitar window 40b. For example, when the cursor CS is positioned on the first string L1 as shown m FIG. 4b, one depression of the cursor key moves the cursor CS onto the second string L2 at a position just beneath the previous position. In addition to the cursor-move processing, the step 70 performs a processing of changing the displayed control window 40c as follows. In the control window 40c, there has been shown in a visual pattern the control data in the performance data corresponding to the previous string on which the cursor CS has been places as explained before, but as the cursor CS moves to the next string, the control data to be displayed on the control window 40c is now changed to the control data of the new (above mentioned "next") string.

For example, when the control window 40c exhibits the data of the velocity and the gate time as the control data with respect to the first string L1 as shown in FIG. 4b, the move of the cursor CS to the second string L2 causes the data of the velocity and the gate time of the second string L2 to be exhibited in the control window 40c as the control data in the window. Under this condition, other control data can be exhibited in the control window by placing the cursor at the list box Nb and clicking the mouse button.

During the looping of the steps 54–66 after the process at the step 70 of FIG. 6, an actuation of either the cursor-left key or the cursor-right key causes the step 56 of FIG. 7 to judge affirmative (Y) thereby directing the process to a step 72. The step 72 judges whether it is under the fret alteration mode now. If it is not under the fret alteration mode, the judgment at the step 72 is negative N and the process moves forward to a step 74. The step 74 moves the cursor CS to a position on the next vertical line along the same horizontal line in the guitar window 40b. The position on the vertical line GL is herein termed as a "grid position". For example, when the cursor CS is on the first line L1 as shown in FIG. 4b and the cursor-right key is depressed one time, the cursor CS moves to the right adjacent grid along the first line L1. And then the process moves to the step 58.

During the looping of the steps 54–66, an actuation of the enter switch causes the step 58 to judge affirmative (Y) thereby directing the process to a step 76. The step 76 judges whether it is under the fret alteration mode now. If it is not under the fret alteration mode, the judgment at the step 76 is negative (N) and the process moves forward to a step 78. The step 78 judges whether there is a fret number at the cursor position. If this judgment is affirmative (Y), the process moves forward to a step 80, and if negative (N), to a step 82.

The step 80 sets the note data corresponding to such a fret number (the fret number at the cursor position) to the fret alteration mode. The step 82, on the other hand, inserts a fret number "0" at the cursor position and sets the note data corresponding to such a fret number to the fret alteration mode. The gate time of the note data to be inserted here may be a predetermined fixed value (e.g. a value representing a quarter note duration), or may be a value which is arbitrarily set by the user.

With respect to the note data which is brought into the fret alteration mode at the step 80 or 82, the fret number becomes alterable by a step 86 to be explained later. Therefore, when the user wants to alter a fret number, the user will place the cursor CS at such a fret number and depress the enter switch one time to set the fret alteration mode. On the other hand, if the user wants to input new note data, the user will place the cursor CS at the grid position on the string to which the user wants to input the new note data and depress the enter switch one time, whereby a fret number "0" is placed there and the fret alteration mode is brought in so that the user can input any desired fret number. After the step 80 or 82, the process moves forward to the step 60 of FIG. 8.

During the looping of the steps 54–66, an actuation of any of the keys in the tenkey pad causes the step 60 to judge affirmative (Y) thereby directing the process to a step 84. The step 84 judges whether it is under the fret alteration mode now. If it is not under the fret alteration mode, the judgment at the step 84 is negative (N) and the process moves forward to a step 62.

If any key in the ten-key group is depressed during the looping of the steps 54–66 under the fret alteration mode as set at the step 80 or 82, both the judgments at the steps 60 and 84 are affirmative (Y) and the process moves forward to a step 86. The step 86 alters the fret number at the cursor position into such a value as is inputted by the ten-key group key. For example, if the numeral "1" is inputted by the ten-key group key when the fret number at the cursor position is "0", the fret number is changed from "0" into "1". The change of the fret numbers displayed on the screen is conducted by rewriting the fret number data in the storage area 16B from the previous fret number at the cursor position into the inputted new fret number. After the step 86, the process moves to the step 62.

If the enter key is depressed during the looping of the steps 54–66 under the fret alteration mode, both the judgments at the steps 58 and 76 of FIG. 7 are affirmative (Y) and the process moves forward to a step 88. The step 88 definitizes the fret number. For example, if the process comes to the step 88 without altering the fret number "0" which was inputted at the step 82, the fret number "0" is definitized (determined for the on-going processing). On the other hand, if the process comes to the step 88 after the fret number has been changed at the step 86 of FIG. 8, the changed fret number is definitized here for the later use.

The next step 90 determines the note pitch of the string to meet the altered fret number based on the tuning data of the string to which the fret number definitized at the step 88 belongs, and issues to the module SMD a command to alter the note pitch of the note data of the string at the fret number under the alteration process into the note pitch determined for the altered fret number. Concurrently with this process, the note pitch of the note data corresponding to the above definitized fret number in the tablature data stored in the storage area 16C into the above determined note pitch. The position of the note on the five-line staff notation is also altered in accordance with the above note pitch alteration.

The following is a description of an embodiment in which the fret number "2" on the first string L1 is altered into "1" and definitized on the tablature notation Q of FIG. 4b. The tuning data of the first string is extracted from the tablature data in the storage area 16C. The tuning data here is the data representing the note pitch E4 (329.628 Hz) and corresponds to the fret number "0". As the fret number "1" is larger than the fret number "0" by the amount of "1", the note pitch corresponding to the fret number "1" is calculated as F4 (349.228 Hz) by adding one semitone to E4. Therefore, in the tablature data in the storage area 16C, the note pitch of the note data corresponding to the previous fret number "2" in the performance data of the first string (i.e. the performance data on the first track) is changed F4. Also to the module SMD is issued a command to alter the note pitch of the note data corresponding to the previous fret number "2" in the performance data of the first string (the performance data on Track 5 in the case of FIG. 2) into F4. After the step 90, the process moves forward to a step 92 to clear the fret alteration mode. Then, the process moves to the step 60.

When either of the cursor-up key or the cursor-down key is depressed during the looping of the steps 54–66 under the fret alteration mode, both the judgments at the steps 54 and 68 of FIG. 6 are affirmative (Y) and the process moves forward to a step 94. The step 94 definitizes the fret number as in the step 88 above before moving forward to a step 96. The step 96 performs a similar processing as in the step 90 above. Namely, the step 96 determines the note pitch of the string to meet the altered fret number based on the tuning data of the string to which the fret number definitized at the step 94 belongs, and issues to the module SMD a command to alter the note pitch of the note data of the string at the fret number under the alteration process into the note pitch determined for the altered fret number. Concurrently with this process, the note pitch of the note data corresponding to the above definitized fret number in the tablature data stored in the storage area 16C into the above determined note pitch. The specific contents of the processing are like those described with respect to the step 90 above. After the step 96, the process moves forward to a step 98 to clear the fret alteration mode. Then, the process moves to the step 70 to perform the cursor move processing and the control window display alteration processing as described before.

When either of the cursor-up key or the cursor-down key is actuated as described above, a similar processes takes place as in the case of depressing the enter switch, in which the fret number at the cursor position is definitized, and the note pitch of the note data corresponding to the de-finitized fret number is altered into the note pitch corresponding to the definitized fret number, accompanied by the cursor move and the control window display alteration on the screen. After the step 70 comes the step 56.

When either of the cursor-left key or the cursor-right key is depressed during the looping of the steps 54–66 under the fret alteration mode, both the judgments at the steps 56 and 72 of FIG. 7 are affirmative (Y), and the process moves forward to the step 58. Therefore, the cursor move processing of the step 74 does not take place, when it is under the fret alteration mode.

When the delete switch is actuated during the looping of the steps 54–66 under the fret alteration mode, the judgment at the step 62 of FIG. 8 is affirmative (Y), and the process moves forward to a step 100. The step 100 judges whether there is a fret number at the cursor position. If the judgment here is negative (N), meaning that there is no fret number to be deleted, the process skips to the step 64 for mouse detecting. If the judgment at the step 100 is affirmative (Y), the process proceeds to a step 102 to judge whether it is under the fret alteration mode. As it is under the fret alteration mode not, the judgment at the step 102 is affirmative (Y) and the process skips to the step 64. On the other hand, if the judgment at the step 102 is negative (N), meaning that it is not under the fret alteration mode, the process moves forward to a step 104 to delete the fret number at the cursor position from the tablature notation Q. For this display change, that fret number in We fret number data in the storage area 16B is deleted. Also to the module SMD is issued a command to delete the note data of the string corresponding to such a fret number. Concurrently therewith, the note data corresponding to such a fret number is deleted from the tablature data in the storage area 16C. As a result, the note exhibited on the five-staff notation P corresponding to such a fret number is deleted from the screen. After the step 104, the process moves forward to the step 64.

When the mouse is manipulated during the looping of the steps 54–66, the step 64 judges affirmative (Y) to direct the process to a stop 106 for the mouse processing, which will be described in detail herein later. And after the mouse processing, the process comes to the step 66.

When any other switch or key is manipulated during the looping of the steps 54–66, the judgment at the step 66 becomes affirmative (Y) and the process moves forward to a step 108. The step 108 performs processing corresponding to the actuated switch or key. For example, where the note duration symbols a, b and c of FIG. 4b are allotted to the function keys F1, F2 and F3 on the computer keyboard (serving as the panel switches 38), in response to the actuation of the key F1, F2 or F3, the note duration a, b or c which corresponds to the actuated function key is selected, and the vertical lines GL are displayed in the guitar window 40b at the time points corresponding to the note duration of the selected symbol. When the exit key as actuated, the process flow exits from the looping of the steps 54–66 to end the guitar window processing.

According to the processing as described above, the cursor CS can be moved to a desired string by actuating the cursor-up or cursor-down key. With respect to the destination string or target string (meaning the string positioned by the cursor CS after the move), the control data in the performance data of the destination string are visualized in the control window 40c so that the user can confirm the control data, or input or alter the control data easily.

Further with respect to the cursor destination string, the fret alteration mode can be easily set by the manipulation of the enter key and the fret number can be altered as desired using the ten-key keys. And the note pitch of the note data is automatically altered according to the alteration of the fret number. When the fret alteration mode is not set, the delete key causes the fret number at the cursor position to be deleted from the window. Further, in the case where the fret alteration mode is not set, the manipulation of the cursor-left or cursor-right key moves the cursor position horizontally to any desired grid position.

Figure 9A:
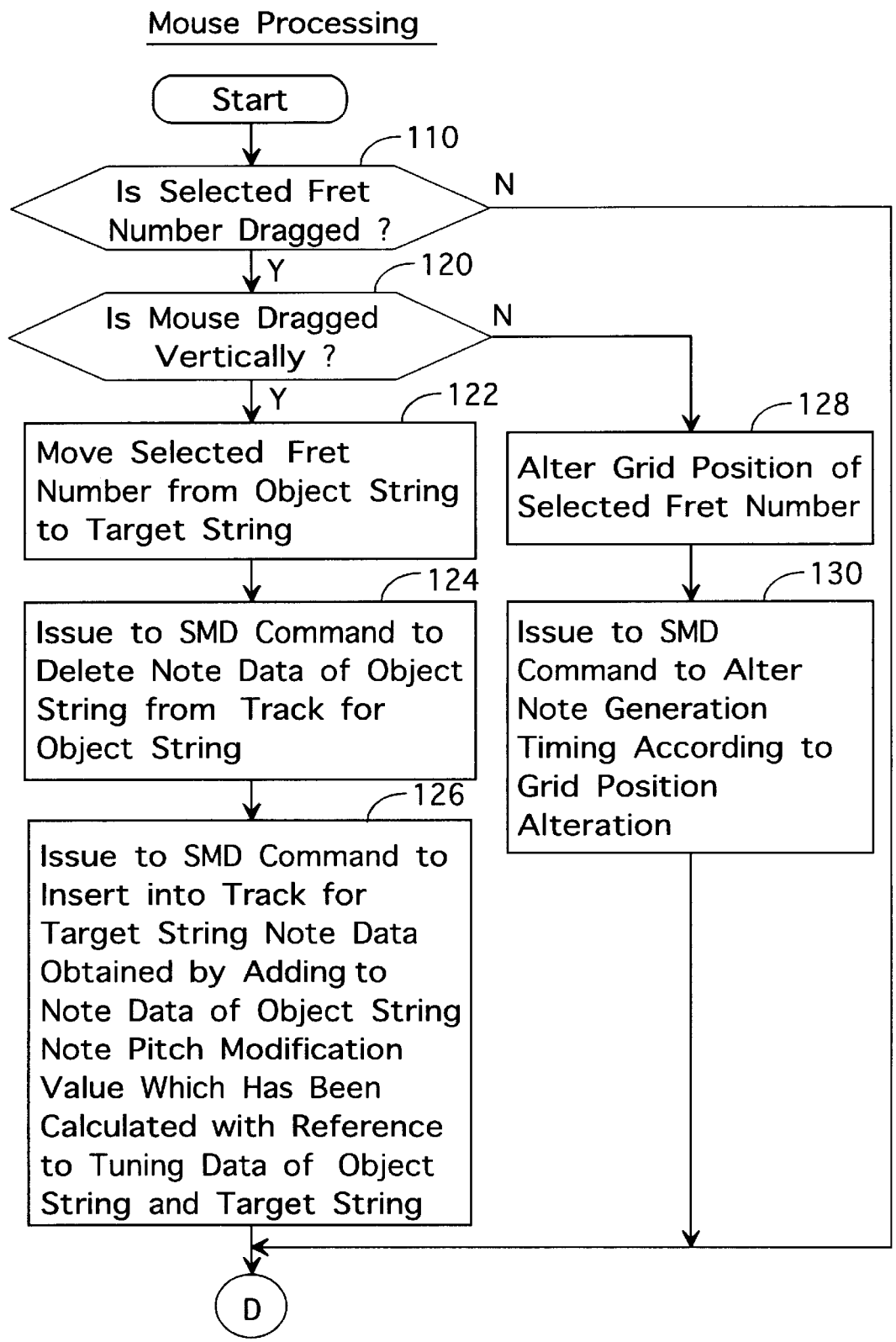
FIGS. 9a and 9b in combination is a flow chart showing a mouse processing in the present invention.
Figure 9B:
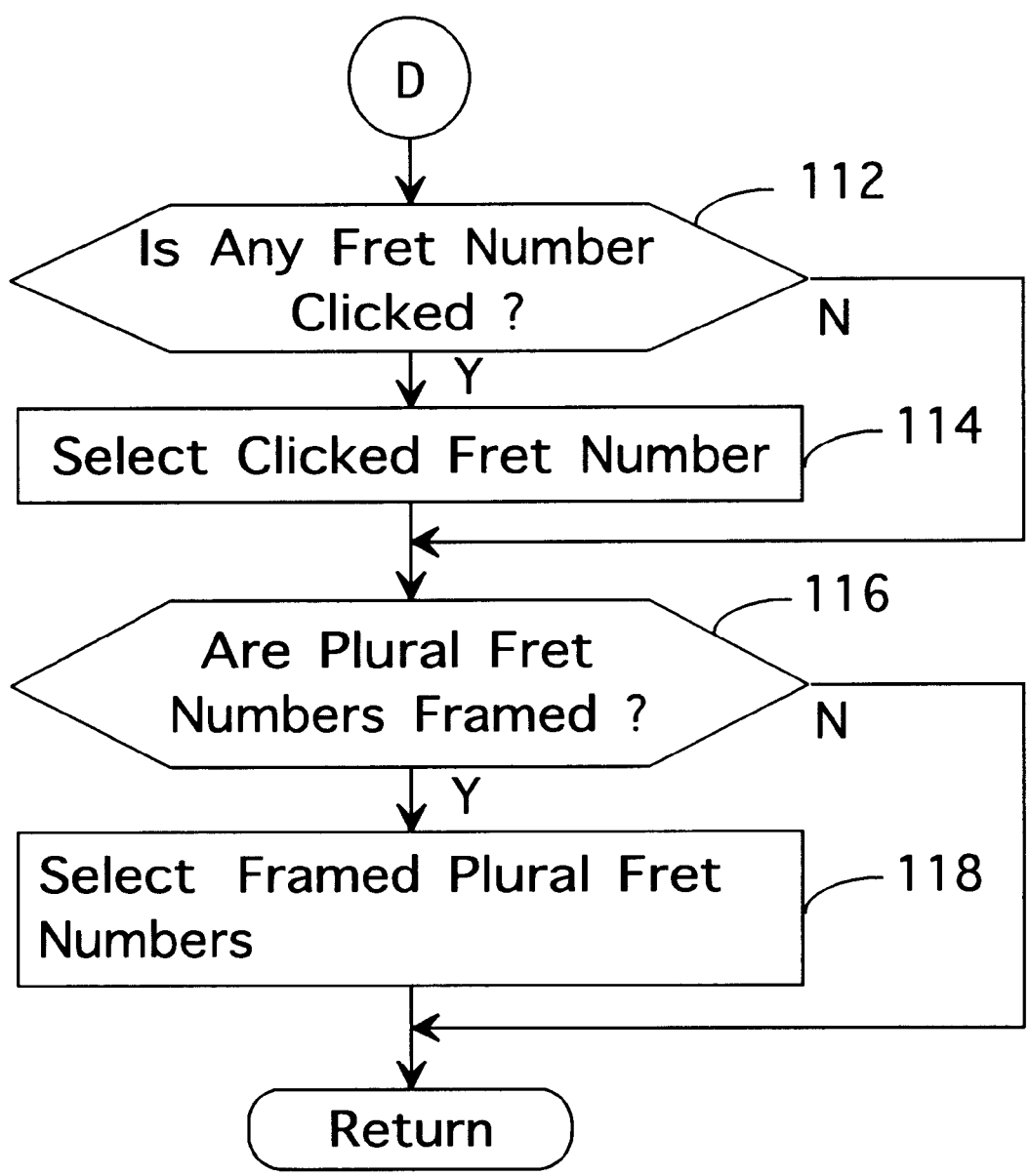

FIG. 9a and 9b show in combination the mouse processing performed in the embodiment of the present invention. In FIG. 9a, a step 110 judges whether there is a dragging manipulation of the selected fret number. The dragging is effected by moving the mouse with its switch button kept pressed (on). The selection of the fret number is conducted through the steps 112–118, and consequently when the process flow comes to the mouse processing of FIG. 9a for the first time, the judgment at the step 110 is negative (N) and the process flows to a step 112 of FIG. 9b. The step 112 judges whether there is any fret number clicked on the tablature notation Q. The clicking of the fret number is conducted by positioning the cursor CS on the exhibited fret number in the screen and pressing the mouse switch. When the step 112 judges affirmative (Y), the process moves forward to a step 114. The step 114 selects the clicked fret number (the one at the cursor position) for the succeeding processing. When the process of the step 114 is completed or when the judgment at the step 112 is negative (N), the process comes to a step 116.

The step 116 judges whether there is a operation of surrounding a plurality of fret numbers with a rectangular frame to designate the plural fret numbers. This operation can be conducted by the dragging manipulation of the mouse. When the step 116 judges affirmative (Y), the process moves forward to a step 118. The step 118 selects the plural fret numbers (those enclosed in the rectangular frame). When the process of the step 118 is completed or when the judgment at the step 116 is negative (N), the process returns to the routine of FIGS. 6–8 to go to the step 66. According to the above described processes, the user can select either one fret number through the steps 112 and 114 or a plurality of fret numbers through the steps 116 and 118.

While the process flow is looping through the steps 54–66, the mouse dragging manipulation of the selected fret number or numbers causes both the step 64 of FIG. 8 and the step 110 of FIG. 9a to judge affirmative (Y), and the process moves -forward to a step 120. The step 120 judges whether the direction of the mouse dragging is vertical. If this judgment is affirmative (Y), the process proceeds to a step 122.

The step 122 moves the selected fret number or numbers from the origin string or object string (this means the string before the move) to the destination string or target string (this means the string after the move) among the strings. Such a move of the fret number or numbers is conducted by deleting the selected fret number or numbers in the fret number data on the recording track for the origin string and inserting (writing) the same selected fret number or numbers in the fret number data on the recording track for the destination string in the storage area 16B. For example, in order to move the fret number "2" on the first string L1 onto the second string L2, the user selects the fret number "2" on the string L1 by clicking it with the mouse and drags the same onto the string L2, and then the fret number "2" in the fret number data on the first track in the storage area 16B is deleted from the grid position at which the fret number "2" used to be located before the move, and the same fret number "2" is inserted at the same grid position in the fret number data on the second track. As a result, the fret number "2" of the first string L1 moves to the second string L2 in the tablature notation Q.

The next step 124 issues to the module SMD a command to delete the note data corresponding to the selected fret number or numbers of the object string from the recording track for the object string. Concurrently therewith, the note data corresponding to the selected fret number or numbers on the object string are deleted from the recording track for the object string. In the above example of moving the fret number "2" on the first string L1 onto the second string L2, a command to delete the note data corresponding to the above fret number from the performance data of the first string (i.e. the performance data on the track 5 in the case of FIG. 2) is issued to the module SMD. Also in the storage area 16C, the note data corresponding to the fret number "2" is deleted from the performance data on the first track.

Then, a step 126 issues to the module SMD a command to insert, into the track for the target string at the time point where the above deleted note data used to be located, the note data which are obtained by adding to the note data of the object string a note pitch modification value which has been calculated with reference to the tuning data of the object string and of the target string. Concurrently therewith, also in the tablature data in the storage area 16C, the note data obtained by adding the above note pitch modification value to the note pitch on the object string are inserted in the track for the target string at the time point where the above deleted note data used to be located before the move. The note pitch modification value is obtained based on the tuning data of the object string and of the target string. For example, where the object string or origin string is the first string L2 and the target string or destination string is the second string L2, the tuning data of the first string L1 indicates the note E4 (329.628 Hz) and the tuning data of the second string L2 indicates the note B3 (246.942 Hz), which means the open string note pitch of the second string is five semitones lower than the open string note pitch of the first string and the note pitch modification value is "−5".

In the above example of moving the fret number "2" of the first string L1 to the second string L2, the addition of "−5" to the note pitch "F#4" which corresponds to the fret number "2" on the first string L1 makes the note pitch "C#4". To the module SMD is issued a command to insert the note data of the note pitch "C#4" corresponding to the fret number "2" into the performance data of the second string (the performance data on the track 6 in the case of FIG. 2). Also in the tablature data in the storage area 16C, the note data of the note pitch "C#4" is inserted (written) in the performance data on the second track. Both with respect to the module SMD and the storage area 16C, the note generation timing in the note data of the note pitch "C#4" to be inserted is made the same as that of the note data of the note pitch "F#4". According to the above alteration with respect to the tablature data in the storage area 16C, the note "F#4" in the five-line staff notation P is replaced by the note "C#4". After the step 126, the process moves forward to the step 112 in FIG. 9b.

When the step 120 judges negative (N), it means that the dragging manipulation of the mouse is horizontal and the process goes to a step 128. The step 128 alter the grid position of the selected fret number or numbers according to the amount of the dragging manipulation of the mouse. Then the process moves to a step 130. The 130 issues to the module SMD a command to alter the note generation time point with respect to the note data corresponding to the selected fret number or numbers according to the above grid position alteration at the step 128. Also with respect to the tablature data in the storage area 16C, the note generation time point for the note data corresponding to the selected fret number or numbers is altered according to the grid position alteration at the step 128. As a result, on the five-line staff notation P, the position along the time axis (abscissa) of the note corresponding to the selected fret number is altered to the altered generation time point. After the step 130, the process moves to the step 112 of FIG. 9b.

With the processing of the flow shown in FIGS. 9a and 9b, the move of a desired fret number or numbers on the tablature notation Q from one string to another causes the alteration of the recording track of the note data corresponding to the selected fret number or numbers in the storage area 16A and in the tablature data in the storage area 16C in accordance with the fret number move from one string to another. And further, the note pitch of the note data to be recorded on the track for the destination string can be calculated based on the tuning data of the origin string and of the destination string. Therefore, for example, if the note data of the second string are erroneously inputted in the recording track for the first track when the user inputs the note data by seeing the tablature available in the market, then the note data of the second string can be recorded in the recording track for the second string with the correct note pitches by merely moving the fret number or numbers on the first string to the second string in the tablature. This eliminates the necessity of inputting the data again for the correct string.

Figure 10:
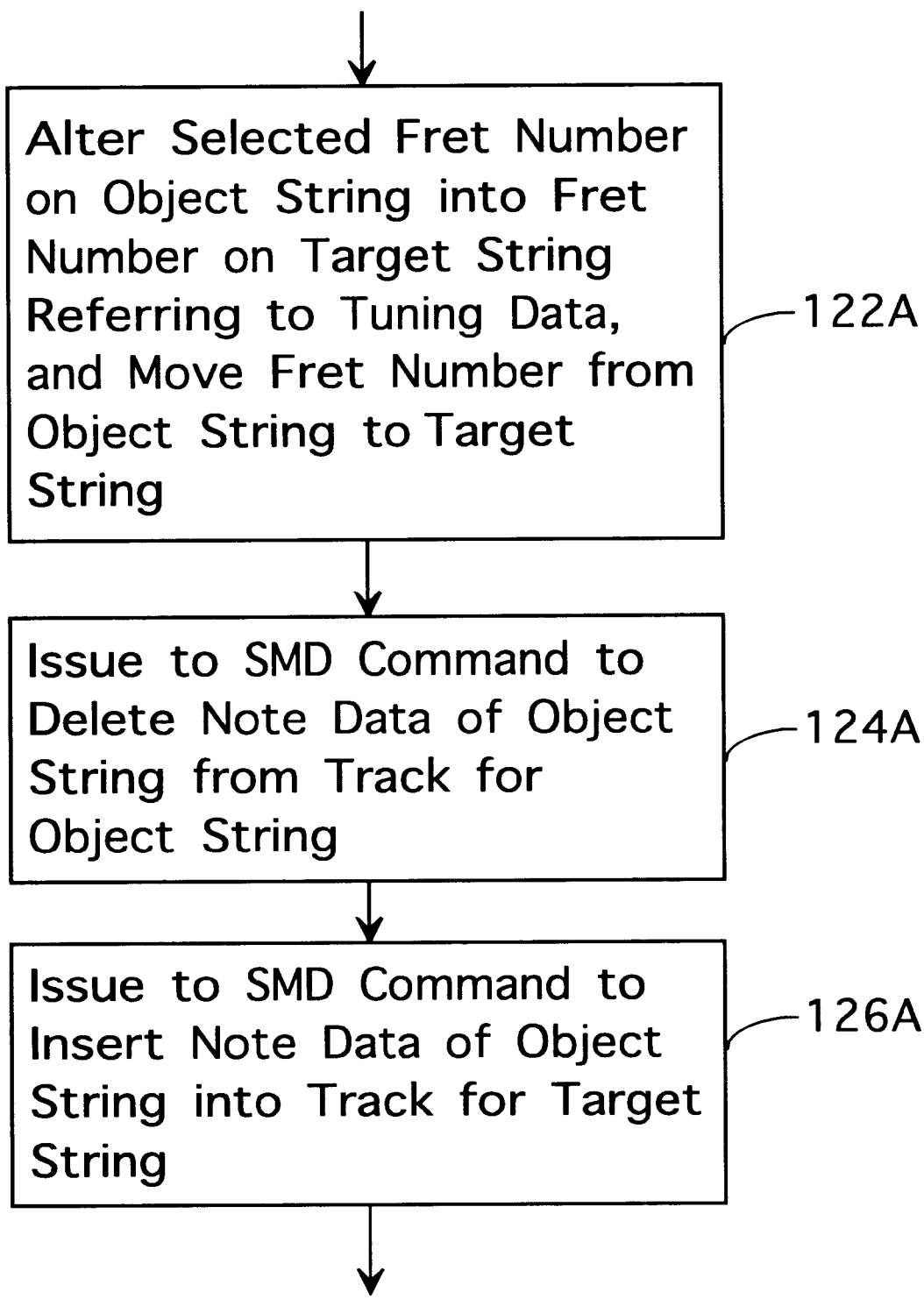
FIG. 10 is a flow chart showing an alternative part of the mouse processing.

FIG. 10 a partial flow of the mouse processing as an alternative to a corresponding part of FIG. 9a. Steps 122A, 124A and 126A in FIG. 10 correspond to the steps 122, 124 and 126 in FIG. 9, respectively. The other steps to be combined with FIG. 10 are the same as those in FIGS. 9a and 9b. FIG. 10 differs from FIGS. 9a and 9b in that the fret numbers are altered with altering the note pitches.

The step 122A alters the selected fret number or numbers on the object string into a fret number or numbers on the target string referring to the tuning data of the object string and of the target string, and move the altered fret number from the object string to the target string. The alteration of the fret number is performed based on the tuning data of the object string and of the target string in the manner as follows. For example, where the object string (origin string) is the second string L2 and the target string (destination string) is the third string L3, the tuning data of the second string represents B3 note (246.942 Hz) and the tuning data of the third string represents G3 note (195.998 Hz), which means that the note pitch of the third string at its open string condition is four semitones lower than the note pitch of the second string at its open string condition. Therefore, in order to generate on the third string the same note pitch as generated on the second string, the fret number for the third string is obtained by adding a value of "4" to the fret number on the second string. For example, when the fret number "3" on the second string L2 is to be moved onto the third string L3, "3" plus "4" makes "7". The fret number "7" on the third string defines the D4 note (293.665 Hz). In the storage area 16C, the fret number "3" in the fret number data on the second string track is deleted, and the fret number "7" is inserted (written) in the fret number data on the third string track at the same time point as the time point on the second string track at which the deleted fret number used to be recorded, which causes the numeral "7" is exhibited on the third string L3 at the position just under the position on the second string L2 where the numeral "3" used to be exhibited. After the step 122A, the process moves forward to a step 124A.

The step 124A issues to the module SMD a command to delete the note data of the object string corresponding to the selected fret number or numbers from the track corresponding to the object string. Concurrently therewith, also in the tablature data in the storage area 16C, the note data corresponding to the selected fret number or numbers of the object string are deleted from the track corresponding to the object string. Where the fret number "3" of the second string L2 is to be moved onto the third string L3 as in the above example, a command is issued to the module SMD to delete the note data corresponding to the fret number "3" in the performance data of the second string (performance data on Track 6 in the case of FIG. 2). Also in the tablature data in the storage area 16C, the note data corresponding the fret number "3" in the performance data on the second string track is deleted. After the step 124A, the process moves forward to a step 126A.

The step 126A issues to the module SMD a command to insert the note data of the object string corresponding to the selected fret number or numbers into the track for the target string at the time point at which the deleted note data used to be placed on the track for the object string. Concurrently therewith, also in the tablature data on the storage area 16C, the note data of the object string corresponding to the selected fret number or numbers is inserted (written) into the track for the target string at the time point at which the deleted note data used to be recorded in the track of the object string. Where the fret number "3" on the second string L2 is to be moved onto the third string L3 as in the above example, a command is issued to the module SMD to insert (write) in the performance data of the third string (performance data on Track 7 in the case of FIG. 2) the note data corresponding to the fret "3" of the second string. Also in the tablature data in the storage area 16C, the note data corresponding to the fret number "3" of the second string is inserted (written) in the performance data on the third string track. As a result, the note data corresponding to the fret number "7" has the same note pitch as the note data corresponding to the fret number "3" of the second string.

According to the above-mentioned process of FIG. 10, the move of a desired fret number or numbers on the tablature notation Q from one string to another causes the alteration of the recording track of the note data corresponding to the selected fret number or numbers in the storage area 16A and in the tablature data in the storage area 16C in compliance with the fret number move from one string to another. And further, the fret number or numbers can be altered based on the tuning data of the origin string and of the destination string. As the note pitch in the note data is maintained during the alteration of the fret numbers, it will be easy to obtain different series of performance data including different fingering (in terms of strings and frets) for one melody. However, if the fret numbers are to be altered for other strings keeping the note pitches unchanged, the calculated fret number may become negative in value or may exceed the maximum limit for the instrument In such a situation, there may be provided value limits at "0" and the maximum available value, or such an interstring move itself may be invalidated or nullified.

While several forms of the invention have been shown and described hereinabove, it should be understood that the invention is not limited thereto but that various modifications can be made by those skilled in the art, particularly in light of the foregoing teachings. For example, the following modifications will be made without departing from the spirit and scope of the invention.

(1) Although in the described embodiment, the sequencer module and the tablature display and input edit module are separate program modules one from the other, one program module covering both the sequencer function and the tablature display and input edit function may be employed instead.

(2) The apparatus may be so configured that the move of the note data from one string to another or the alteration of the grid position are controlled by the use of the cursor key (cursor switch). For example, the note data corresponding to a particular fret number may be moved from one string to another by locating the cursor CS at a desired fret number in the display screen and manipulating the cursor switch while the "control" key on the keyboard for the panel switch group 38 is being depressed. Further, the note data corresponding to a plurality of fret numbers may be moved from one string to another by the manipulation of the cursor switch together with the "control" key. In order to select a plurality of fret numbers using the cursor switch, the cursor CS may be first located at a fret number in the screen and then shifted successively to the next fret numbers by manipulating the cursor switch together with the shift key on the keyboard of the panel switch group.

(3) The move from one string to another and the move from one grid to another may be accomplished at a same time in combination by dragging the mouse diagonally.

(4) The invention is applicable not only to the guitar, but also to the edition of the performance data of various stringed musical instruments such as the string bass.

(5) The invention may be practiced not only in the form of an electronic musical instrument, but also in the form of a combination of a personal computer and an application software. The application software may be stored in a magnetic disk, a magneto-optic disk, a semiconductor memory, etc. and may be supplied to the personal computer therefrom.

(6) The invention is applicable not only to a keyboard type electronic musical instrument, but also to other types of electronic musical instrument such as a stringed instrument type, a wind instrument type and a percussion instrument type.

(7) The invention is applicable not only to an electronic musical instrument incorporating a built-in tone generator, a built-in automatic performance device, etc., but also to an electronic musical instrument configured by connecting a keyboard device, a tone generator device, an automatic performance device via communication lines like a MIDI network and various networks.

(8) The format of the performance data of a melody, a chord accompaniment, etc. may not be limited to the "event+relative time" form which represents each event time point by the relative time counted from the immediately preceding event, but may be the "event+absolute time" form which represents each event time point by the absolute time counted from the very beginning of the music piece or from the beginning of every measure (plus the measure number), or may be the "note pitch+duration" form which represents the contents of the music by note pitches and note durations, and rests and rest durations, or may be the "direct event mapping" form which provides a memory region for every minimum time unit (resolution) and locates the events at the respective memory regions which correspond to the respective event time points, or may be any other arbitrary form.

(9) The method of varying the tempo for the music progression may be variously employed from among the method of varying the frequency of the tempo clock, the method of altering the values of the timing data keeping the frequency of the tempo clock unchanged, the method of altering the counter values for counting up to the tempo clock, and so forth.

(10) Where there are a plurality of channels of performance data, the performance data for the plural channels may be recorded on a single track in an intermixed fashion, or the performance data for each channel may be recorded on each separate track.

(11) In recording the performance data aligned in time series, the data may be recorded at contiguous regions in the memory according to the time series of the performance, or the data may be recorded at distributed regions and administered as contiguous data in time sense.

Therefore, the invention has various merits and advantages, including the following.

(1) The move of a stopping position (fret number) from one string to another on the tablature notation causes the move of the note data from one track to another in the storage device. This eliminates troublesome tasks of deleting and inputting the data in the performance data.

(2) In moving the note data from one recording track to another, the note pitch in the note data is altered automatically based on the tuning data of the strings, retaining the fret position. This eliminates the user's task of calculating and altering the note pitches in the performance data.

(3) Also in moving the note data from one recording track to another, the stopping position of the string is altered automatically based on the tuning data of the strings, retaining the note pitch. This eliminates the user's task of altering the stopping position in the performance data.

(4) Further, where the note generation time point in the performance data is altered automatically in response to the alteration of the stopping position from one time point to another time point on the display screen, the user's task of altering the note generation time point in the performance data will be eliminated.

(5) Further, where a desired stopping position is selected and an alternative stopping position for such a selected stopping position is inputted, the note pitch of the note data corresponding to the inputted stopping position is automatically obtained based on the tuning data of the string. This eliminates the user's troublesome task of altering the note pitch.

(6) Further, the input, the alteration, the deletion, etc. of the data are conducted with the cursor placed at the desired string line on the tablature notation. This facilitates the edition of the data with respect to the stopping position, etc.

(7) Further, the control parameters of the performance tones are visually exhibited on the screen based on the control data in the performance data corresponding to the string line on which the cursor is located on the tablature notation. This facilitates the recognition, the input, the alteration, etc. of the control data.

(8) Further, when a desired time point is designated on the tablature notation and a new stopping position is placed at the designated time point, the note data for the new stopping position is recorded on the corresponding track by automatically obtaining the note pitch for that note data based on the tuning data of the string and attaching the timing data corresponding to the designated time point. This eliminates the user's troublesome task of inputting the note pitch and the tone generation time point.

The description of the invention has been made hereinabove only for the purposes of clarity and example, and should not be taken as limiting the invention as defined by the following claims, which include all equivalent means whether now known or later devised. It is therefore contemplated by the appended claims to cover any modifications that incorporate the features of improvements in the true spirit and scope of the invention.

What is claimed is:

1. A musical performance data editing apparatus comprising:

a storage device which includes a plurality of recording tracks for recording a plurality of series of performance data corresponding to a plurality of strings of a stringed musical instrument, each series of performance data corresponding to each of said strings and including note data representing note pitches of musical tones to be generated on said each string;

a display device which has a display screen and exhibits on said display screen a plurality of lines respectively corresponding to said plurality of strings, indicating a stopping position of each of said strings which defines the note pitch represented by said note data;

a manipulating device which is to be manipulated by a user of the apparatus and produces a command in response to a user's manipulation to cause said string stopping position on one of said plurality of strings to be moved onto another of said plurality of strings exhibited on said display screen;

a display control device which controls said display device to move the string stopping position on one of the lines corresponding to said one of the strings onto another of said lines corresponding to said in another of the strings on said display screen in response to said command from said manipulating device; and an editing device which, in response to said command, deletes the note data representing the note pitch defined by said stopping position on said one of the strings before the move from the series of performance data on one of said tracks corresponding to said one of the strings, and inserts note data representing a note pitch defined by said stopping position on said another of the strings after the move into the series of performance data on another of said tracks corresponding to said other of the strings.

2. A musical performance data editing apparatus as claimed in claim 1, wherein:

each of said series of performance data further includes tuning data of the corresponding one of said strings representing the note pitch thereof at the open string status;

said display control device causes said display device to exhibit on said another of the lines after the move the same string stopping position as the stopping position on said one of the lines before the move; and said editing device determines said note pitch of the note data to be inserted based on the tuning data of said one of the strings and the tuning data of said another of the strings.

3. A musical performance data editing apparatus as claimed in claim 1, wherein:

each of said series of performance data further includes tuning data of the corresponding one of said strings representing the note pitch thereof at the open string status;

said display control device obtains the stopping position for said other of the strings by altering the stopping position of said one of the strings based on a pitch difference between the tuning data of said one of the strings and the tuning data of said an other of the strings, and causes said display device to exhibit on said other of the lines after the move the altered stopping position; and said editing device inserts the note data which represents the same note pitch as defined by said stopping position on said one of the strings before the move into the series of performance data on said another of the tracks corresponding to said other of the strings.

4. A musical performance data editing apparatus comprising:

a storage device which includes a plurality of recording tracks for recording a plurality of series of performance data corresponding to a plurality of strings of a stringed musical instrument, each series of performance data corresponding to each of said strings and including note data and timing data respectively representing note pitches and time points of musical tones to be generated on said each string;

a display device which has a display screen and exhibits on said display screen a plurality of horizontal lines respectively corresponding to said plurality of strings, indicating a stopping position of each of said strings which defines the note pitch represented by said note data, and also exhibits a plurality of vertical lines crossing said horizontal lines and spaced apart from each other by a distance corresponding to a unit count time of a music progression;

a manipulating device which is to be manipulated by a user of the apparatus and produces a command in response to a user's manipulation to cause said string stopping position at one of said vertical lines on one of said plurality of strings to be moved to another of said vertical lines on said one of the strings exhibited on said display screen;

a display control device which controls said display device to move the string stopping position on one of said horizontal lines corresponding to said one of the strings from said one of the vertical lines to said another of the vertical lines on said display screen in response to said command from said manipulating device; and an editing device which, in response to said command, alters the timing data in the series of performance data on one of said tracks corresponding to said one of the strings representing the musical time point defined by said one of the vertical lines at which said stopping position locates on said one of the strings before the move to represent the musical time point defined by said another of the vertical lines.

5. A musical performance data editing apparatus comprising:

a storage device which includes a plurality of recording tracks for recording a plurality of series of performance data corresponding to a plurality of strings of a stringed musical instrument, each series of performance data corresponding to each of said strings and including note data representing note pitches of musical tones to be generated on said each string and turning data of said each string representing the note pitch thereof at the open string status;

a display device which has a display screen and exhibits on said display screen a plurality of lines respectively corresponding to said plurality of strings, indicating a stopping position of each of said strings which defines the note pitch represented by said note data;

a selecting device which selects a stopping position on one of said strings;

an input device for inputting a stopping position to be an alternative to said selected stopping position;

a display control device which controls said display device to exhibit said inputted stopping position in place of said selected stopping position on one of said lines corresponding to said one of the strings on said display screen in response to said input from said input device; and an editing device which, in response to said input from said input device, alters the note data in the series of performance data on one of said tracks corresponding to said selected stopping position on said one of the strings to note data representing a note pitch obtained from said inputted stopping position and said tuning data of said one of the strings.

6. A musical performance data editing apparatus comprising:

a storage device which includes a plurality of recording tracks for recording a plurality of series of performance data corresponding to a plurality of strings of a stringed musical instrument, each series of performance data corresponding to each of said strings and including note data representing note pitches of musical tones to be generated on said each string;

a display device which has a display screen and exhibits on said display screen a plurality of lines respectively corresponding to said plurality of strings, indicating a stopping position of each of said strings which defines the note pitch represented by said note data;

a manipulating device which is to be manipulated by a user of the apparatus and produces a command in response to a user's manipulation to locate a cursor at a desired one of said lines corresponding to one of said strings exhibited on said display screen;

a display control device which controls said display device to locate the cursor on the line corresponding to said desired one of the strings in response to said command from said manipulating device; and an editing device which, in response to said command, conducts the edition of the performance data including at least any one of inputting, alteration and deletion with respect to the data concerning said one line on which the cursor is located.

7. A musical performance data editing apparatus comprising:

a storage device which includes a plurality of recording tracks for recording a plurality of series of performance data corresponding to a plurality of strings of a stringed musical instrument, each series of performance data corresponding to each of said strings and including control data representing a controlling condition of parameters of musical tone generation on said each string;

a display device which has a display screen and exhibits on said display screen a plurality of lines respectively corresponding to said plurality of strings, indicating a stopping position of each of said strings which defines the note pitch represented by said note data;

a manipulating device which is to be manipulated by a user of the apparatus and produces a command in response to a user's manipulation to locate a cursor at a desired one of said lines corresponding to one of said strings exhibited on said display screen; and a display control device which, in response to said command from said manipulating device, reads out from said storage device said control data in said performance data of the string corresponding to said one of the lines on which said cursor is located, and controls said display device to exhibit said controlling condition of parameters of the musical tone generation based on said read out control data.

8. A musical performance data editing apparatus comprising:

a storage device which includes a plurality of recording tracks for recording a plurality of series of performance data corresponding to a plurality of strings of a stringed musical instrument, each series of performance data corresponding to each of said strings and including note data and timing data respectively representing note pitches and time points of musical tones to be generated on said each string, and tuning data of said each string representing the note pitch thereof at the open string status;

a display device which has a display screen and exhibits on said display screen a plurality of horizontal lines respectively corresponding to said plurality of strings, indicating a stopping position of each of said strings which defines the note pitch represented by said note data, and also exhibits a plurality of vertical lines crossing said horizontal lines and spaced apart from each other by a distance corresponding to a unit count time of a music progression;

a selecting device which selects one of said vertical lines along one of said horizontal lines;

a display control device which controls said display device to exhibit a new stopping position at the location of said selected vertical line on said one of the horizontal lines; and an editing device which, in response to the selection of said vertical line, writes said timing data corresponding to said selected vertical line and note data corresponding to said new stopping position into the performance data on the track in said storage device corresponding to said one of the strings, a note pitch of said note data being obtained from said new stopping position and said tuning data of said one of the strings.

9. A method for editing musical performance data using a computer, a storage device and a display device, said method comprising:

a step of providing in said storage device a plurality of recording tracks;

a step of recording on said plurality of recording tracks a plurality of series of performance data corresponding to a plurality of strings of a stringed musical instrument, each series of performance data corresponding to each of said strings and including note data representing note pitches of musical tones to be generated on said each string;

a step of exhibiting on a display screen of said display device a plurality of lines respectively corresponding to said plurality of strings, indicating a stopping position of each of said strings which defines the note pitch represented by said note data;

a step of controlling said display device to move the string stopping position on one of said plurality of lines onto another of said plurality of lines on said display screen; and a step of editing the performance data including a substep of deleting the note data which represents the note pitch defined by said stopping position on said one of the lines before the move from the series of performance data on one of said tracks corresponding to one of the strings, and a substep of inserting note data which represents a note pitch defined by said stopping position on said another of the lines after the move into the series of performance data on another of said tracks corresponding to said another of the strings.

10. A method for editing musical performance data using a computer, a storage device and a display device, said method comprising:

a step of providing in said storage device a plurality of recording tracks;

a step of recording on said plurality of recording tracks a plurality of series of performance data corresponding to a plurality of strings of a stringed musical instrument, each series of performance data corresponding to each of said strings and including note data and timing data respectively representing note pitches and time points of musical tones to be generated on said each string;

a step of exhibiting on a display screen of said display device a plurality of horizontal lines respectively corresponding to said plurality of strings, indicating a stopping position of each of said horizontal lines which defines the note pitch represented by said note data, and also exhibits a plurality of vertical lines crossing said horizontal lines and spaced apart from each other by a distance corresponding to a unit count time of a music progression;

a step of controlling said display device to move the string stopping position on said one of the lines from one of said vertical lines to another of said vertical lines on said display screen; and a step of editing the performance data including a substep of altering the timing data in the series of performance data on one of said tracks corresponding to said one of the strings representing the musical time point defined by said one of the vertical lines at which said stopping position locates on said one of the lines before the move to represent the musical time point defined by said another of the vertical lines.

11. A method for editing musical performance data using a computer, a storage device and a display device, said method comprising:

a step of providing in said storage device a plurality of recording tracks;

a step of recording on said plurality of recording tracks a plurality of series of performance data corresponding to a plurality of strings of a stringed musical instrument, each series of performance data corresponding to each of said strings and including note data representing note pitches of musical tones to be generated on said each string and tuning data of said each string representing the note pitch thereof at the open string status;

a step of exhibiting on a display screen of said display device a plurality of lines respectively corresponding to said plurality of strings, indicating a stopping position of each of said strings which defines the note pitch represented by said note data;

a step of selecting a stopping position of one of said strings;

a step of inputting a stopping position to be an alternative to said selected stopping position;

a step of controlling said display device to exhibit the inputted stopping position in place of the selected stopping position on one of said lines corresponding to said one of the strings on said display screen; and a step of editing the performance data including a substep of altering the note data in the series of performance data on one of said tracks corresponding to said selected stopping position on said one of the strings to note data representing a note pitch obtained from said inputted stopping position and said tuning data of said one of the strings.

12. A method for editing musical performance data using a computer, a storage device and a display device, said method comprising:

a step of providing in said storage device a plurality of recording tracks;

a step of recording on said plurality of recording tracks a plurality of series of performance data corresponding to a plurality of strings of a stringed musical instrument, each series of performance data corresponding to each of said strings and including note data representing note pitches of musical tones to be generated on said each string;

a step of exhibiting on a display screen of said display device a plurality of lines respectively corresponding to said plurality of strings, indicating a stopping position of each of said strings which defines the note pitch represented by said note data;

a step of controlling said display device to locate a cursor on a line corresponding to a desired one of the strings; and a step of editing the performance data including at least any one of the substeps of inputting, altering and deleting the data concerning said line on which the cursor is located.

13. A method for editing musical performance data using a computer, a storage device and a display device, said method comprising:

a step of providing in said storage device a plurality of recording tracks;

a step of recording on said plurality of recording tracks a plurality of series of performance data corresponding to a plurality of strings of a stringed musical instrument, each series of performance data corresponding to each of said strings and including control data representing a controlling condition of parameters of musical tone generation on said each string;

a step of exhibiting on a display screen of said display device a plurality of lines respectively corresponding to said plurality of strings, indicating a stopping position of each of said strings which defines the note pitch represented by said note data; and a step of controlling said display device to read out from said storage device said control data in said performance data of the string corresponding to said one of the lines on which a cursor is located, and to control said display device to exhibit said controlling condition of parameters of the musical tone generation based on said read out control data.

14. A method for editing musical performance data using a computer, a storage device and a display device, said method comprising:

a step of providing in said storage device a plurality of recording tracks;

a step of recording on said plurality of recording tracks a plurality of series of performance data corresponding to a plurality of strings of a stringed musical instrument, each series of performance data corresponding to each of said strings and including note data and timing data respectively representing note pitches and time points of musical tones to be generated on said each string, and tuning data of said each string representing the note pitch thereof at the open string status;

a step of exhibiting on a display screen of said display device a plurality of horizontal lines respectively corresponding to said plurality of strings, indicating a stopping position of each of said strings which defines the note pitch represented by said note data, and also exhibits a plurality of vertical lines crossing said horizontal lines and spaced apart from each other by a distance corresponding to a unit count time of a music progression;

a step of selecting one of said vertical lines along one of said horizontal lines;

a step of controlling said display device to exhibit a new stopping position at the location of said selected vertical line on said one of the horizontal; and a step of editing the performance data by writing said timing data corresponding to said selected vertical line and note data corresponding to said new stopping position into the performance data on the track in said storage device corresponding to said one of the strings, a note pitch of said note data being obtained from said new stopping position and said tuning data of said one of the strings.

15. A machine readable medium for use in an apparatus for editing musical performance data, said apparatus being of a data processing type comprising a computer, a storage device and a display device, said medium containing program instructions executable by said computer for executing:

a process of providing in said storage device a plurality of recording tracks;

a process of recording on said plurality of recording tracks a plurality of series of performance data corresponding to a plurality of strings of a stringed musical instrument, each series of performance data corresponding to each of said strings and including note data representing note pitches of musical tones to be generated on said each string;

a process of exhibiting on a display screen of said display device a plurality of lines respectively corresponding to said plurality of strings, indicating a stopping position of each of said strings which defines the note pitch represented by said note data;

a process of controlling said display device to move the string stopping position on one of said plurality of lines onto another of said plurality of lines on said display screen; and a process of editing the performance data including a substep of deleting the note data which represents the note pitch defined by said stopping position on said one of the lines before the move from the series of performance data on one of said tracks corresponding to one of the strings, and a substep of inserting note data which represents a note pitch defined by said stopping position on said another of the lines after the move into the series of performance data on another of said tracks corresponding to said another of the strings.

16. A machine readable medium for use in an apparatus for editing musical performance data, said apparatus being of a data processing type comprising a computer, a storage device and a display device, said medium containing program instructions executable by said computer for executing:

a process of providing in said storage device a plurality of recording tracks;

a process of recording on said plurality of recording tracks a plurality of series of performance data corresponding to a plurality of strings of a stringed musical instrument, each series of performance data corresponding to each of said strings and including note data and timing data respectively representing note pitches and time points of musical tones to be generated on said each string;

a process of exhibiting on a display screen of said display device a plurality of horizontal lines respectively corresponding to said plurality of strings, indicating a stopping position of each of said horizontal lines which defines the note pitch represented by said note data, and also exhibits a plurality of vertical lines crossing said horizontal lines and spaced apart from each other by a distance corresponding to a unit count time of a music progression;

a process of controlling said display device to move the string stopping position on said one of the lines from one of said vertical lines to another of said vertical lines on said display screen; and a process of editing the performance data including a substep of altering the timing data in the series of performance data on one of said tracks corresponding to said one of the strings representing the musical time point defined by said one of the vertical lines at which said stopping position locates on said one of the lines before the move to represent the musical time point defined by said another of the vertical lines.

17. A machine readable medium for use in an apparatus for editing musical performance data, said apparatus being of a data processing type comprising a computer, a storage device and a display device, said medium containing program instructions executable by said computer for executing:

a process of providing in said storage device a plurality of recording tracks;

a process of recording on said plurality of recording tracks a plurality of series of performance data corresponding to a plurality of strings of a stringed musical instrument, each series of performance data corresponding to each of said strings and including note data representing note pitches of musical tones to be generated on said each string and tuning data of said each string representing the note pitch thereof at the open string status;

a process of exhibiting on a display screen of said display device a plurality of lines respectively corresponding to said plurality of strings, indicating a stopping position of each of said strings which defines the note pitch represented by said note data;

a process of selecting a stopping position of one of said strings;

a process of inputting a stopping position to be an alternative to said selected stopping position;

a process of controlling said display device to exhibit the inputted stopping position in place of the selected stopping position on one of said lines corresponding to said one of the strings on said display screen; and a process of editing the performance data including a substep of altering the note data in the series of performance data on one of said tracks corresponding to said selected stopping position on said one of the strings to note data representing a note pitch obtained from said inputted stopping position and said tuning data of said one of the strings.

18. A machine readable medium for use in an apparatus for editing musical performance data, said apparatus being of a data processing type comprising a computer, a storage device and a display device, said medium containing program instructions executable by said computer for executing:

a process of providing in said storage device a plurality of recording tracks;

a process of recording on said plurality of recording tracks a plurality of series of performance data corresponding to a plurality of strings of a stringed musical instrument, each series of performance data corresponding to each of said strings and including note data representing note pitches of musical tones to be generated on said each string;

a process of exhibiting on a display screen of said display device a plurality of lines respectively corresponding to said plurality of strings, indicating a stopping position of each of said strings which defines the note pitch represented by said note data;

a process of controlling said display device to locate a cursor on a line corresponding to a desired one of the strings; and a process of editing the performance data including at least any one of the substeps of inputting, altering and deleting tie data concerning said line on which the cursor is located.

19. A machine readable medium for use in an apparatus for editing musical performance data, said apparatus being of a data processing type comprising a computer, a storage device and a display device, said medium containing program instructions executable by said computer for executing:

a press of providing in said storage device a plurality of recording tracks;

a process of recording on said plurality of recording tracks a plurality of series of performance data corresponding to a plurality of strings of a stringed musical instrument, each series of performance data corresponding to each of said strings and including control data representing a controlling condition of parameters of musical tone generation on said each string;

a process of exhibiting on a display screen of said display device a plurality of lines respectively corresponding to said plurality of strings, indicating a stopping position of each of said strings which defines the note pitch represented by said note data; and a process of controlling said display device to read out from said storage device said control data in said performance data of the string corresponding to said one of the lines on which a cursor is located, and to control said display device to exhibit said controlling condition of parameters of the musical tone generation based on said read out control data.

20. A machine readable medium for use in an apparatus for editing musical performance data, said apparatus being of a data processing type comprising a computer, a storage device and a display device, said medium containing program instructions executable by said computer for executing:

a process of providing in said storage device a plurality of recording tracks;

a process of recording on said plurality of recording tracks a plurality of series of performance data corresponding to a plurality of strings of a stringed musical instrument, each series of performance data corresponding to each of said strings and including note data and timing data respectively representing note pitches and time points of musical tones to be generated on said each string, and tuning data of said each string representing the note pitch thereof at the open string status;

a process of exhibiting on a display screen of said display device a plurality of horizontal lines respectively corresponding to said plurality of strings, indicating a stopping position of each of said strings which defines the note pitch represented by said note data, and also exhibits a plurality of vertical lines crossing said horizontal lines and spaced apart from each other by a distance corresponding to a unit count time of a music progression;

a process of selecting one of said vertical lines along one of said horizontal lines;

a process of controlling said display device to exhibit a new stopping position at the location of said selected vertical line on said one of the horizontal; and a process of editing the performance data by writing said timing data corresponding to said selected vertical line and note data corresponding to said new stopping position into the performance data on the track in said storage device corresponding to said one of the strings, a note pitch of said note data being obtained from said new stopping position and said tuning data of said one of the strings.

* * * * *